United States Patent
Lien et al.

(10) Patent No.: US 12,340,028 B2
(45) Date of Patent: Jun. 24, 2025

(54) RF-BASED MICRO-MOTION TRACKING FOR GESTURE TRACKING AND RECOGNITION

(71) Applicants: Google LLC, Mountain View, CA (US); The Board of Trustees of the Leland Stanford Junior University, Palo Alto, CA (US)

(72) Inventors: Jaime Lien, Mountain View, CA (US); Erik M. Olson, Mountain View, CA (US); Patrick M. Amihood, Mountain View, CA (US); Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 2 days.

(21) Appl. No.: 18/356,885

(22) Filed: Jul. 21, 2023

(65) Prior Publication Data

US 2023/0367400 A1 Nov. 16, 2023

Related U.S. Application Data

(63) Continuation of application No. 17/023,122, filed on Sep. 16, 2020, now Pat. No. 11,709,552, which is a
(Continued)

(51) Int. Cl.
*G06F 3/01* (2006.01)
*G01S 7/41* (2006.01)
(Continued)

(52) U.S. Cl.
CPC ............. *G06F 3/017* (2013.01); *G01S 7/415* (2013.01); *G01S 13/58* (2013.01); *G01S 13/66* (2013.01);
(Continued)

(58) Field of Classification Search
CPC .......... G06F 3/017; G06F 3/011; G01S 7/415; G01S 13/58; G01S 13/66; G01S 13/88; G01S 13/89
See application file for complete search history.

(56) References Cited

U.S. PATENT DOCUMENTS 3,610,874 A 10/1971 Gagliano
3,752,017 A 8/1973 Lloyd et al.
(Continued)

FOREIGN PATENT DOCUMENTS

CN 1299501 6/2001
CN 1462382 12/2003
(Continued)

OTHER PUBLICATIONS

Woodbridge et al. ("A Real-Time High Resolution Passive WiFi Doppler-Radar and Its Applications," 2014 International Radar Conference, Oct. 13-17, 2014, pp. 1-6) (Year: 2014).*
(Continued)

*Primary Examiner* — William Lu
(74) *Attorney, Agent, or Firm* — Colby Nipper PLLC

(57) ABSTRACT

This document describes techniques for radio frequency (RF) based micro-motion tracking. These techniques enable even millimeter-scale hand motions to be tracked. To do so, radar signals are used from radar systems that, with conventional techniques, would only permit resolutions of a centimeter or more.

23 Claims, 10 Drawing Sheets

Related U.S. Application Data continuation of application No. 16/252,477, filed on Jan. 18, 2019, now Pat. No. 10,817,070, which is a continuation of application No. 15/142,689, filed on Apr. 29, 2016, now Pat. No. 10,241,581.

(60) Provisional application No. 62/167,823, filed on May 28, 2015, provisional application No. 62/155,357, filed on Apr. 30, 2015.

(51) Int. Cl.
*G01S 13/58* (2006.01)
*G01S 13/66* (2006.01)
*G01S 13/88* (2006.01)
*G01S 13/89* (2006.01)

(52) U.S. Cl.
CPC .............. *G01S 13/88* (2013.01); *G01S 13/89* (2013.01); *G06F 3/011* (2013.01)

(56) References Cited

U.S. PATENT DOCUMENTS

| | | | |
|---|---|---|---|
| 3,953,706 | A | 4/1976 | Harris et al. |
| 4,104,012 | A | 8/1978 | Ferrante |
| 4,654,967 | A | 4/1987 | Thenner |
| 4,700,044 | A | 10/1987 | Hokanson et al. |
| 4,795,998 | A | 1/1989 | Dunbar et al. |
| 4,838,797 | A | 6/1989 | Dodier |
| 5,016,500 | A | 5/1991 | Conrad et al. |
| 5,121,124 | A | 6/1992 | Spivey et al. |
| 5,298,715 | A | 3/1994 | Chalco et al. |
| 5,309,916 | A | 5/1994 | Hatschek |
| 5,341,979 | A | 8/1994 | Gupta |
| 5,410,471 | A | 4/1995 | Alyfuku et al. |
| 5,468,917 | A | 11/1995 | Brodsky et al. |
| 5,564,571 | A | 10/1996 | Zanotti |
| 5,656,798 | A | 8/1997 | Kubo et al. |
| 5,724,707 | A | 3/1998 | Kirk et al. |
| 5,798,798 | A | 8/1998 | Rector et al. |
| 6,032,450 | A | 3/2000 | Blum |
| 6,037,893 | A | 3/2000 | Lipman |
| 6,080,690 | A | 6/2000 | Lebby et al. |
| 6,101,431 | A | 8/2000 | Niwa et al. |
| 6,210,771 | B1 | 4/2001 | Post et al. |
| 6,254,544 | B1 | 7/2001 | Hayashi |
| 6,303,924 | B1 | 10/2001 | Adan et al. |
| 6,313,825 | B1 | 11/2001 | Gilbert |
| 6,340,979 | B1 | 1/2002 | Beaton et al. |
| 6,380,882 | B1 * | 4/2002 | Hegnauer .............. G01S 13/56 342/107 |
| 6,386,757 | B1 | 5/2002 | Konno |
| 6,440,593 | B2 | 8/2002 | Ellison et al. |
| 6,492,980 | B2 | 12/2002 | Sandbach |
| 6,493,933 | B1 | 12/2002 | Post et al. |
| 6,513,833 | B2 | 2/2003 | Breed et al. |
| 6,513,970 | B1 | 2/2003 | Tabata et al. |
| 6,524,239 | B1 | 2/2003 | Reed et al. |
| 6,543,668 | B1 | 4/2003 | Fujii et al. |
| 6,616,613 | B1 | 9/2003 | Goodman |
| 6,711,354 | B2 | 3/2004 | Kameyama |
| 6,717,065 | B2 | 4/2004 | Hosaka et al. |
| 6,802,720 | B2 | 10/2004 | Weiss et al. |
| 6,833,807 | B2 | 12/2004 | Flacke et al. |
| 6,835,898 | B2 | 12/2004 | Eldridge et al. |
| 6,854,985 | B1 | 2/2005 | Weiss |
| 6,929,484 | B2 | 8/2005 | Weiss et al. |
| 6,970,128 | B1 | 11/2005 | Dwelly et al. |
| 6,997,882 | B1 | 2/2006 | Parker et al. |
| 7,019,682 | B1 | 3/2006 | Louberg et al. |
| 7,134,879 | B2 | 11/2006 | Sugimoto et al. |
| 7,158,076 | B2 | 1/2007 | Fiore et al. |
| 7,164,820 | B2 | 1/2007 | Eves et al. |
| 7,194,371 | B1 | 3/2007 | McBride et al. |
| 7,205,932 | B2 | 4/2007 | Fiore |
| 7,223,105 | B2 | 5/2007 | Weiss et al. |
| 7,230,610 | B2 | 6/2007 | Jung et al. |
| 7,249,954 | B2 | 7/2007 | Weiss |
| 7,266,532 | B2 | 9/2007 | Sutton et al. |
| 7,299,964 | B2 | 11/2007 | Jayaraman et al. |
| 7,310,236 | B2 | 12/2007 | Takahashi et al. |
| 7,317,416 | B2 | 1/2008 | Flom et al. |
| 7,348,285 | B2 | 3/2008 | Dhawan et al. |
| 7,365,031 | B2 | 4/2008 | Swallow et al. |
| 7,421,061 | B2 | 9/2008 | Boese et al. |
| 7,462,035 | B2 | 12/2008 | Lee et al. |
| 7,528,082 | B2 | 5/2009 | Krans et al. |
| 7,544,627 | B2 | 6/2009 | Tao et al. |
| 7,578,195 | B2 | 8/2009 | DeAngelis et al. |
| 7,644,488 | B2 | 1/2010 | Aisenbrey |
| 7,647,093 | B2 | 1/2010 | Bojovic et al. |
| 7,670,144 | B2 | 3/2010 | Ito et al. |
| 7,677,729 | B2 | 3/2010 | Vilser et al. |
| 7,691,067 | B2 | 4/2010 | Westbrook et al. |
| 7,698,154 | B2 | 4/2010 | Marchosky |
| 7,750,841 | B2 | 7/2010 | Oswald et al. |
| 7,791,700 | B2 | 9/2010 | Bellamy |
| 7,834,276 | B2 | 11/2010 | Chou et al. |
| 7,845,023 | B2 | 12/2010 | Swatee |
| 7,941,676 | B2 | 5/2011 | Glaser |
| 7,952,512 | B1 | 5/2011 | Delker et al. |
| 7,999,722 | B2 | 8/2011 | Beeri et al. |
| 8,062,220 | B2 | 11/2011 | Kurtz et al. |
| 8,063,815 | B2 | 11/2011 | Valo et al. |
| 8,169,404 | B1 | 5/2012 | Boillot |
| 8,179,604 | B1 | 5/2012 | Prada Gomez et al. |
| 8,193,929 | B1 | 6/2012 | Siu et al. |
| 8,199,104 | B2 | 6/2012 | Park et al. |
| 8,282,232 | B2 | 10/2012 | Hsu et al. |
| 8,289,185 | B2 | 10/2012 | Alonso |
| 8,301,232 | B2 | 10/2012 | Albert et al. |
| 8,314,732 | B2 | 11/2012 | Oswald et al. |
| 8,326,313 | B2 | 12/2012 | McHenry et al. |
| 8,334,226 | B2 | 12/2012 | Nhan et al. |
| 8,341,762 | B2 | 1/2013 | Balzano |
| 8,344,949 | B2 | 1/2013 | Moshfeghi |
| 8,367,942 | B2 | 2/2013 | Howell et al. |
| 8,475,367 | B1 | 7/2013 | Yuen et al. |
| 8,505,474 | B2 | 8/2013 | Kang et al. |
| 8,509,882 | B2 | 8/2013 | Albert et al. |
| 8,514,221 | B2 | 8/2013 | King et al. |
| 8,527,146 | B1 | 9/2013 | Jackson et al. |
| 8,549,829 | B2 | 10/2013 | Song et al. |
| 8,560,972 | B2 | 10/2013 | Wilson |
| 8,562,526 | B2 * | 10/2013 | Heneghan .............. G16H 40/63 128/920 |
| 8,569,189 | B2 | 10/2013 | Bhattacharya et al. |
| 8,576,110 | B2 | 11/2013 | Valentine |
| 8,614,689 | B2 | 12/2013 | Nishikawa et al. |
| 8,655,004 | B2 | 2/2014 | Prest et al. |
| 8,700,137 | B2 | 4/2014 | Albert |
| 8,758,020 | B2 | 6/2014 | Burdea et al. |
| 8,759,713 | B2 | 6/2014 | Sheats |
| 8,764,651 | B2 | 7/2014 | Tran |
| 8,785,778 | B2 | 7/2014 | Streeter et al. |
| 8,790,257 | B2 | 7/2014 | Libbus et al. |
| 8,814,574 | B2 | 8/2014 | Selby et al. |
| 8,819,812 | B1 | 8/2014 | Weber et al. |
| 8,854,433 | B1 | 10/2014 | Rafii |
| 8,860,602 | B2 | 10/2014 | Nohara et al. |
| 8,921,473 | B1 | 12/2014 | Hyman |
| 8,948,839 | B1 | 2/2015 | Longinotti-Buitoni et al. |
| 9,055,879 | B2 | 6/2015 | Selby et al. |
| 9,075,429 | B1 | 7/2015 | Karakotsios et al. |
| 9,093,289 | B2 | 7/2015 | Vicard et al. |
| 9,125,456 | B2 | 9/2015 | Chow |
| 9,141,194 | B1 | 9/2015 | Keyes et al. |
| 9,148,949 | B2 | 9/2015 | Guofu et al. |
| 9,223,494 | B1 | 12/2015 | DeSalvo et al. |
| 9,229,102 | B1 | 1/2016 | Wright et al. |
| 9,230,160 | B1 | 1/2016 | Kanter |
| 9,235,241 | B2 | 1/2016 | Newham et al. |
| 9,316,727 | B2 | 4/2016 | Sentelle et al. |
| 9,331,422 | B2 | 5/2016 | Nazzaro et al. |

(56) References Cited

U.S. PATENT DOCUMENTS

| | | | |
|---|---|---|---|
| 9,335,825 B2 * | 5/2016 | Rautiainen | G06F 3/011 |
| 9,346,167 B2 | 5/2016 | O'Connor et al. | |
| 9,354,709 B1 | 5/2016 | Heller et al. | |
| 9,412,273 B2 | 8/2016 | Ricci | |
| 9,508,141 B2 | 11/2016 | Khachaturian et al. | |
| 9,511,877 B2 | 12/2016 | Masson | |
| 9,524,597 B2 | 12/2016 | Ricci | |
| 9,569,001 B2 | 2/2017 | Mistry et al. | |
| 9,575,560 B2 * | 2/2017 | Poupyrev | G06F 3/014 |
| 9,582,933 B1 | 2/2017 | Mosterman et al. | |
| 9,588,625 B2 | 3/2017 | Poupyrev | |
| 9,594,443 B2 | 3/2017 | VanBlon et al. | |
| 9,600,080 B2 | 3/2017 | Poupyrev | |
| 9,693,592 B2 | 7/2017 | Robinson et al. | |
| 9,699,663 B1 | 7/2017 | Jovancevic | |
| 9,746,551 B2 * | 8/2017 | Scholten | G01S 7/003 |
| 9,766,742 B2 | 9/2017 | Papakostas | |
| 9,778,749 B2 * | 10/2017 | Poupyrev | G06F 21/316 |
| 9,807,619 B2 | 10/2017 | Tsai et al. | |
| 9,811,164 B2 | 11/2017 | Poupyrev | |
| 9,817,109 B2 | 11/2017 | Saboo et al. | |
| 9,837,760 B2 | 12/2017 | Karagozler et al. | |
| 9,848,780 B1 | 12/2017 | DeBusschere et al. | |
| 9,870,056 B1 | 1/2018 | Yao | |
| 9,921,660 B2 * | 3/2018 | Poupyrev | G06F 3/017 |
| 9,933,908 B2 | 4/2018 | Poupyrev | |
| 9,947,080 B2 | 4/2018 | Nguyen et al. | |
| 9,958,541 B2 | 5/2018 | Kishigami et al. | |
| 9,958,950 B2 * | 5/2018 | Li | G06F 3/03 |
| 9,971,414 B2 * | 5/2018 | Gollakota | G06F 3/017 |
| 9,971,415 B2 | 5/2018 | Poupyrev et al. | |
| 9,983,747 B2 | 5/2018 | Poupyrev | |
| 9,994,233 B2 | 6/2018 | Diaz-Jimenez et al. | |
| 10,016,162 B1 | 7/2018 | Rogers et al. | |
| 10,027,923 B1 | 7/2018 | Chang | |
| 10,034,630 B2 | 7/2018 | Lee et al. | |
| 10,063,427 B1 | 8/2018 | Brown | |
| 10,064,582 B2 | 9/2018 | Rogers | |
| 10,073,590 B2 | 9/2018 | Dascola et al. | |
| 10,080,528 B2 | 9/2018 | DeBusschere et al. | |
| 10,082,950 B2 | 9/2018 | Lapp | |
| 10,088,908 B1 | 10/2018 | Poupyrev et al. | |
| 10,139,916 B2 | 11/2018 | Poupyrev | |
| 10,155,274 B2 | 12/2018 | Robinson et al. | |
| 10,175,781 B2 | 1/2019 | Karagozler et al. | |
| 10,203,405 B2 | 2/2019 | Mazzaro et al. | |
| 10,203,763 B1 | 2/2019 | Poupyrev et al. | |
| 10,222,469 B1 | 3/2019 | Gillian et al. | |
| 10,241,581 B2 | 3/2019 | Lien et al. | |
| 10,268,321 B2 | 4/2019 | Poupyrev | |
| 10,285,456 B2 | 5/2019 | Poupyrev et al. | |
| 10,300,370 B1 | 5/2019 | Amihood et al. | |
| 10,310,620 B2 | 6/2019 | Lien et al. | |
| 10,310,621 B1 | 6/2019 | Lien et al. | |
| 10,376,195 B1 | 8/2019 | Reid et al. | |
| 10,379,621 B2 | 8/2019 | Schwesig et al. | |
| 10,401,490 B2 | 9/2019 | Gillian et al. | |
| 10,409,385 B2 | 9/2019 | Poupyrev | |
| 10,459,080 B1 | 10/2019 | Schwesig et al. | |
| 10,492,302 B2 | 11/2019 | Karagozler et al. | |
| 10,496,182 B2 | 12/2019 | Lien et al. | |
| 10,503,883 B1 | 12/2019 | Gillian et al. | |
| 10,509,478 B2 | 12/2019 | Poupyrev et al. | |
| 10,540,001 B1 | 1/2020 | Poupyrev et al. | |
| 10,572,027 B2 | 2/2020 | Poupyrev et al. | |
| 10,579,150 B2 | 3/2020 | Gu et al. | |
| 10,642,367 B2 | 5/2020 | Poupyrev | |
| 10,660,379 B2 | 5/2020 | Poupyrev et al. | |
| 10,664,059 B2 | 5/2020 | Poupyrev | |
| 10,664,061 B2 | 5/2020 | Poupyrev | |
| 10,705,185 B1 | 7/2020 | Lien et al. | |
| 10,768,712 B2 | 9/2020 | Schwesig et al. | |
| 10,817,065 B1 | 10/2020 | Lien et al. | |
| 10,817,070 B2 | 10/2020 | Lien et al. | |
| 10,908,696 B2 | 2/2021 | Amihood et al. | |
| 10,908,896 B2 | 2/2021 | Lang et al. | |
| 10,931,934 B2 | 2/2021 | Richards et al. | |
| 10,936,081 B2 | 3/2021 | Poupyrev | |
| 10,936,085 B2 | 3/2021 | Poupyrev et al. | |
| 10,948,996 B2 | 3/2021 | Poupyrev et al. | |
| 11,080,556 B1 | 8/2021 | Gillian et al. | |
| 11,103,015 B2 | 8/2021 | Poupyrev et al. | |
| 11,132,065 B2 | 9/2021 | Gillian et al. | |
| 11,140,787 B2 | 10/2021 | Karagozler et al. | |
| 11,169,988 B2 | 11/2021 | Poupyrev et al. | |
| 11,175,743 B2 | 11/2021 | Lien et al. | |
| 11,221,682 B2 | 1/2022 | Poupyrev | |
| 11,256,335 B2 | 2/2022 | Poupyrev et al. | |
| 11,385,721 B2 | 7/2022 | Lien et al. | |
| 11,393,092 B2 | 7/2022 | Sun et al. | |
| 11,592,909 B2 | 2/2023 | Poupyrev et al. | |
| 11,656,336 B2 | 5/2023 | Amihood et al. | |
| 11,698,438 B2 | 7/2023 | Lien et al. | |
| 11,698,439 B2 | 7/2023 | Lien et al. | |
| 11,709,552 B2 | 7/2023 | Lien et al. | |
| 11,816,101 B2 | 11/2023 | Poupyrev et al. | |
| 12,085,670 B2 | 9/2024 | Amihood et al. | |
| 12,117,560 B2 | 10/2024 | Gillian et al. | |
| 12,153,571 B2 | 11/2024 | Poupyrev et al. | |
| 2001/0030624 A1 | 10/2001 | Schwoegler | |
| 2001/0035836 A1 | 11/2001 | Miceli et al. | |
| 2002/0009972 A1 | 1/2002 | Amento et al. | |
| 2002/0080156 A1 | 6/2002 | Abbott et al. | |
| 2002/0170897 A1 | 11/2002 | Hall | |
| 2003/0005030 A1 | 1/2003 | Sutton et al. | |
| 2003/0036685 A1 | 2/2003 | Goodman | |
| 2003/0071750 A1 | 4/2003 | Benitz | |
| 2003/0093000 A1 | 5/2003 | Nishio et al. | |
| 2003/0100228 A1 | 5/2003 | Bungo et al. | |
| 2003/0119391 A1 | 6/2003 | Swallow et al. | |
| 2003/0122677 A1 | 7/2003 | Kail | |
| 2004/0008137 A1 | 1/2004 | Hassebrock et al. | |
| 2004/0009729 A1 | 1/2004 | Hill et al. | |
| 2004/0046736 A1 | 3/2004 | Pryor et al. | |
| 2004/0102693 A1 | 5/2004 | Jenkins et al. | |
| 2004/0157662 A1 | 8/2004 | Tsuchiya | |
| 2004/0249250 A1 | 12/2004 | McGee et al. | |
| 2004/0259391 A1 | 12/2004 | Jung et al. | |
| 2005/0069695 A1 | 3/2005 | Jung et al. | |
| 2005/0128124 A1 | 6/2005 | Greneker et al. | |
| 2005/0148876 A1 | 7/2005 | Endoh et al. | |
| 2005/0195330 A1 | 9/2005 | Zacks | |
| 2005/0231419 A1 | 10/2005 | Mitchell | |
| 2005/0267366 A1 | 12/2005 | Murashita et al. | |
| 2006/0035554 A1 | 2/2006 | Glaser et al. | |
| 2006/0040739 A1 | 2/2006 | Wells | |
| 2006/0047386 A1 | 3/2006 | Kanevsky et al. | |
| 2006/0061504 A1 | 3/2006 | Leach, Jr. et al. | |
| 2006/0125803 A1 | 6/2006 | Westerman et al. | |
| 2006/0136997 A1 | 6/2006 | Telek et al. | |
| 2006/0139162 A1 | 6/2006 | Flynn | |
| 2006/0139314 A1 | 6/2006 | Bell | |
| 2006/0148351 A1 | 7/2006 | Tao et al. | |
| 2006/0157734 A1 | 7/2006 | Onodero et al. | |
| 2006/0166620 A1 | 7/2006 | Sorensen | |
| 2006/0170584 A1 | 8/2006 | Romero et al. | |
| 2006/0209021 A1 | 9/2006 | Yoo et al. | |
| 2006/0244654 A1 | 11/2006 | Cheng et al. | |
| 2006/0258205 A1 | 11/2006 | Locher et al. | |
| 2006/0284757 A1 | 12/2006 | Zemany | |
| 2007/0024488 A1 | 2/2007 | Zemany et al. | |
| 2007/0024946 A1 | 2/2007 | Panasyuk et al. | |
| 2007/0026695 A1 | 2/2007 | Lee et al. | |
| 2007/0027369 A1 | 2/2007 | Pagnacco et al. | |
| 2007/0030195 A1 | 2/2007 | Steinway et al. | |
| 2007/0118043 A1 | 5/2007 | Oliver et al. | |
| 2007/0161921 A1 | 7/2007 | Rausch | |
| 2007/0164896 A1 | 7/2007 | Suzuki et al. | |
| 2007/0176821 A1 | 8/2007 | Flom et al. | |
| 2007/0192647 A1 | 8/2007 | Glaser | |
| 2007/0197115 A1 | 8/2007 | Eves et al. | |
| 2007/0197878 A1 | 8/2007 | Shklarski | |
| 2007/0210074 A1 | 9/2007 | Maurer et al. | |
| 2007/0237423 A1 | 10/2007 | Tico et al. | |

(56) References Cited

U.S. PATENT DOCUMENTS

| | | |
|---|---|---|
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0074307 A1 | 3/2008 | Boric-Lubecke et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0002220 A1 | 1/2009 | Lovberg et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1* | 5/2009 | Kandori ............... A61B 5/1107 600/595 |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0226043 A1 | 9/2009 | Angell et al. |
| 2009/0253585 A1 | 10/2009 | Diatchenko et al. |
| 2009/0262005 A1* | 10/2009 | McNeill ............... G01S 13/9029 342/28 |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0292468 A1 | 11/2009 | Wu et al. |
| 2009/0295712 A1 | 12/2009 | Ritzau |
| 2009/0299197 A1 | 12/2009 | Antonelli et al. |
| 2009/0303100 A1 | 12/2009 | Zemany |
| 2009/0319181 A1 | 12/2009 | Khosravy et al. |
| 2010/0013676 A1 | 1/2010 | Do et al. |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0202656 A1* | 8/2010 | Ramakrishnan ........ G01S 7/539 382/103 |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1* | 7/2011 | Rautiainen ............ G01S 13/56 345/158 |
| 2011/0181510 A1 | 7/2011 | Hakala et al. |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0242305 A1 | 10/2011 | Peterson et al. |
| 2011/0245688 A1 | 10/2011 | Arora et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1* | 1/2012 | Li ........................ G06F 3/017 345/177 |
| 2012/0013571 A1 | 1/2012 | Yeh et al. |
| 2012/0017232 A1* | 1/2012 | Hoffberg .................. F24F 11/30 725/9 |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0075958 A1 | 3/2012 | Hintz |
| 2012/0092284 A1 | 4/2012 | Rofougaran et al. |
| 2012/0105358 A1 | 5/2012 | Momeyer et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0146950 A1 | 6/2012 | Park et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0191223 A1 | 7/2012 | Dharwada et al. |
| 2012/0193801 A1 | 8/2012 | Gross et al. |
| 2012/0200600 A1 | 8/2012 | Demaine |
| 2012/0220835 A1 | 8/2012 | Chung |
| 2012/0243374 A1 | 9/2012 | Dahl et al. |
| 2012/0248093 A1 | 10/2012 | Ulrich et al. |
| 2012/0254810 A1 | 10/2012 | Heck et al. |
| 2012/0268310 A1 | 10/2012 | Kim |
| 2012/0268416 A1 | 10/2012 | Pirogov et al. |
| 2012/0270564 A1 | 10/2012 | Gum et al. |
| 2012/0276849 A1 | 11/2012 | Hyde et al. |
| 2012/0280900 A1* | 11/2012 | Wang .................... G06F 3/0488 345/156 |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angellides |
| 2013/0046544 A1 | 2/2013 | Kay et al. |
| 2013/0053653 A1 | 2/2013 | Cuddihy et al. |
| 2013/0076649 A1 | 3/2013 | Myers et al. |
| 2013/0076788 A1 | 3/2013 | Ben Zvi |
| 2013/0078624 A1 | 3/2013 | Holmes et al. |
| 2013/0079649 A1 | 3/2013 | Mestha et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |

(56) References Cited

U.S. PATENT DOCUMENTS

| | | |
|---|---|---|
| 2013/0102217 A1 | 4/2013 | Jeon |
| 2013/0104084 A1 | 4/2013 | Mlyniec et al. |
| 2013/0106710 A1 | 5/2013 | Ashbrook |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0154919 A1 | 6/2013 | An et al. |
| 2013/0161078 A1 | 6/2013 | Li |
| 2013/0169471 A1 | 7/2013 | Lynch |
| 2013/0176161 A1 | 7/2013 | Derham et al. |
| 2013/0176258 A1 | 7/2013 | Dahl et al. |
| 2013/0194173 A1 | 8/2013 | Zhu et al. |
| 2013/0195330 A1 | 8/2013 | Kim et al. |
| 2013/0196716 A1 | 8/2013 | Khurram |
| 2013/0207962 A1 | 8/2013 | Oberdorfer et al. |
| 2013/0222232 A1 | 8/2013 | Kong et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0249793 A1 | 9/2013 | Zhu et al. |
| 2013/0253029 A1 | 9/2013 | Jain et al. |
| 2013/0260630 A1 | 10/2013 | Ito et al. |
| 2013/0263029 A1 | 10/2013 | Rossi et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0310700 A1 | 11/2013 | Wiard et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0035737 A1 | 2/2014 | Rashid et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139430 A1 | 5/2014 | Leung |
| 2014/0139616 A1 | 5/2014 | Pinter et al. |
| 2014/0143678 A1 | 5/2014 | Mistry et al. |
| 2014/0145955 A1 | 5/2014 | Gomez et al. |
| 2014/0149859 A1 | 5/2014 | Van Dyken et al. |
| 2014/0181509 A1 | 6/2014 | Liu |
| 2014/0184496 A1 | 7/2014 | Gribetz et al. |
| 2014/0184499 A1 | 7/2014 | Kim |
| 2014/0188989 A1 | 7/2014 | Stekkelpak et al. |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0203080 A1 | 7/2014 | Hintz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0084855 A1 | 3/2015 | Song et al. |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0204973 A1 | 7/2015 | Nohara et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0228099 A1* | 8/2015 | Osterhout ............ G06T 11/001 |
| | | 345/633 |
| 2015/0229019 A1* | 8/2015 | Osterhout ............ H01Q 1/276 |
| | | 343/718 |
| 2015/0229885 A1 | 8/2015 | Offenhaeuser |
| 2015/0256763 A1 | 9/2015 | Niemi |
| 2015/0257653 A1 | 9/2015 | Hyde et al. |
| 2015/0261320 A1 | 9/2015 | Leto |
| 2015/0268027 A1 | 9/2015 | Gerdes |
| 2015/0268799 A1 | 9/2015 | Starner et al. |
| 2015/0276925 A1 | 10/2015 | Scholten et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0301167 A1 | 10/2015 | Sentelle et al. |
| 2015/0312041 A1 | 10/2015 | Choi |
| 2015/0314780 A1 | 11/2015 | Stenneth et al. |
| 2015/0317518 A1* | 11/2015 | Fujimaki ............ G02B 27/017 |
| | | 345/633 |
| 2015/0323993 A1 | 11/2015 | Levesque et al. |
| 2015/0332075 A1 | 11/2015 | Burch |
| 2015/0341550 A1 | 11/2015 | Lay |
| 2015/0346701 A1 | 12/2015 | Gordon et al. |
| 2015/0346820 A1 | 12/2015 | Poupyrev et al. |
| 2015/0350902 A1 | 12/2015 | Baxley et al. |
| 2015/0351703 A1 | 12/2015 | Phillips et al. |

(56) References Cited

U.S. PATENT DOCUMENTS

| | | |
|---|---|---|
| 2015/0370250 A1 | 12/2015 | Bachrach et al. |
| 2015/0375339 A1 | 12/2015 | Sterling et al. |
| 2016/0011668 A1 | 1/2016 | Gilad-Bachrach et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0045706 A1 | 2/2016 | Gary et al. |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0075015 A1 | 3/2016 | Izhikevich et al. |
| 2016/0075016 A1 | 3/2016 | Laurent et al. |
| 2016/0077202 A1 | 3/2016 | Hirvonen et al. |
| 2016/0085296 A1 | 3/2016 | Mo et al. |
| 2016/0089042 A1 | 3/2016 | Saponas et al. |
| 2016/0090839 A1 | 3/2016 | Stolarcyzk |
| 2016/0096270 A1 | 4/2016 | Ibarz Gabardos et al. |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0124579 A1 | 5/2016 | Tokutake |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0234365 A1 | 8/2016 | Alameh et al. |
| 2016/0238696 A1 | 8/2016 | Hintz |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0291143 A1 | 10/2016 | Cao et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0131395 A1 | 5/2017 | Reynolds et al. |
| 2017/0168630 A1 | 6/2017 | Khoshkava et al. |
| 2017/0192523 A1 | 7/2017 | Poupyrev |
| 2017/0192629 A1 | 7/2017 | Takada et al. |
| 2017/0196513 A1 | 7/2017 | Longinotti-Buitoni et al. |
| 2017/0224280 A1 | 8/2017 | Bozkurt et al. |
| 2017/0231089 A1 | 8/2017 | Van Keymeulen |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0258366 A1 | 9/2017 | Tupin et al. |
| 2017/0291301 A1 | 10/2017 | Gabardos et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329412 A1 | 11/2017 | Schwesig et al. |
| 2017/0329425 A1 | 11/2017 | Karagozler et al. |
| 2017/0356992 A1 | 12/2017 | Scholten et al. |
| 2018/0000354 A1 | 1/2018 | DeBusschere et al. |
| 2018/0000355 A1 | 1/2018 | DeBusschere et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0095541 A1 | 4/2018 | Gribetz et al. |
| 2018/0106897 A1 | 4/2018 | Shouldice et al. |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0177464 A1 | 6/2018 | DeBusschere et al. |
| 2018/0196527 A1 | 7/2018 | Poupyrev et al. |
| 2018/0256106 A1 | 9/2018 | Rogers et al. |
| 2018/0296163 A1 | 10/2018 | DeBusschere et al. |
| 2018/0321841 A1 | 11/2018 | Lapp |
| 2019/0030713 A1 | 1/2019 | Gabardos et al. |
| 2019/0033981 A1 | 1/2019 | Poupyrev |
| 2019/0138109 A1 | 5/2019 | Poupyrev et al. |
| 2019/0155396 A1 | 5/2019 | Lien et al. |
| 2019/0208837 A1 | 7/2019 | Poupyrev et al. |
| 2019/0232156 A1 | 8/2019 | Amihood et al. |
| 2019/0243464 A1 | 8/2019 | Lien et al. |
| 2019/0257939 A1 | 8/2019 | Schwesig et al. |
| 2019/0278379 A1 | 9/2019 | Gribetz et al. |
| 2019/0321719 A1 | 10/2019 | Gillian et al. |
| 2019/0391667 A1 | 12/2019 | Poupyrev |
| 2019/0394884 A1 | 12/2019 | Karagozler et al. |
| 2020/0064471 A1 | 2/2020 | Gatland et al. |
| 2020/0064924 A1 | 2/2020 | Poupyrev et al. |
| 2020/0089314 A1 | 3/2020 | Poupyrev et al. |
| 2020/0150776 A1 | 5/2020 | Poupyrev et al. |
| 2020/0218361 A1 | 7/2020 | Poupyrev |
| 2020/0229515 A1 | 7/2020 | Poupyrev et al. |
| 2020/0278422 A1 | 9/2020 | Lien et al. |
| 2020/0326708 A1 | 10/2020 | Wang et al. |
| 2020/0393912 A1 | 12/2020 | Lien et al. |
| 2020/0409472 A1 | 12/2020 | Lien et al. |
| 2021/0096653 A1 | 4/2021 | Amihood et al. |
| 2021/0132702 A1 | 5/2021 | Poupyrev |
| 2021/0326642 A1 | 10/2021 | Gillian et al. |
| 2021/0365124 A1 | 11/2021 | Gillian et al. |
| 2022/0019291 A1 | 1/2022 | Lien et al. |
| 2022/0043519 A1 | 2/2022 | Poupyrev et al. |
| 2022/0058188 A1 | 2/2022 | Poupyrev et al. |
| 2022/0066567 A1 | 3/2022 | Lien et al. |
| 2022/0066568 A1 | 3/2022 | Lien et al. |
| 2023/0273298 A1 | 8/2023 | Amihood et al. |
| 2024/0054126 A1 | 2/2024 | Poupyrev et al. |
| 2024/0369685 A1 | 11/2024 | Amihood et al. |
| 2025/0077508 A1 | 3/2025 | Poupyrev et al. |

FOREIGN PATENT DOCUMENTS

| | | |
|---|---|---|
| CN | 1862601 | 11/2006 |
| CN | 101349943 | 1/2009 |
| CN | 101636711 | 1/2010 |
| CN | 101751126 | 6/2010 |
| CN | 101910781 | 12/2010 |
| CN | 102031615 | 4/2011 |
| CN | 102160471 | 8/2011 |
| CN | 102184020 | 9/2011 |
| CN | 102414641 | 4/2012 |

(56) References Cited

FOREIGN PATENT DOCUMENTS

| | | |
|---|---|---|
| CN | 102473032 | 5/2012 |
| CN | 102782612 | 11/2012 |
| CN | 102819315 | 12/2012 |
| CN | 102893327 | 1/2013 |
| CN | 106342197 | 2/2013 |
| CN | 202887794 | 4/2013 |
| CN | 103076911 | 5/2013 |
| CN | 103091667 | 5/2013 |
| CN | 103502911 | 1/2014 |
| CN | 103534664 | 1/2014 |
| CN | 102660988 | 3/2014 |
| CN | 103675868 | 3/2014 |
| CN | 103907405 | 7/2014 |
| CN | 104035552 | 9/2014 |
| CN | 104094194 | 10/2014 |
| CN | 104115118 | 10/2014 |
| CN | 104246659 A | 12/2014 |
| CN | 104838336 | 8/2015 |
| CN | 103355860 | 1/2016 |
| CN | 106154270 | 11/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2417908 | 2/2012 |
| EP | 2637081 | 9/2013 |
| EP | 2770408 | 8/2014 |
| EP | 2014165476 | 10/2014 |
| EP | 2953007 | 12/2015 |
| EP | 2923642 | 3/2017 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | H11168268 | 6/1999 |
| JP | 2003500759 | 1/2003 |
| JP | 2003280049 | 10/2003 |
| JP | 2006163886 | 6/2006 |
| JP | 2006234716 | 9/2006 |
| JP | 2007011873 | 1/2007 |
| JP | 2007132768 | 5/2007 |
| JP | 2007266772 | 10/2007 |
| JP | 2008287714 | 11/2008 |
| JP | 2008293501 | 12/2008 |
| JP | 2009037434 | 2/2009 |
| JP | 2010048583 | 3/2010 |
| JP | 2010049583 | 3/2010 |
| JP | 2011003202 | 1/2011 |
| JP | 2011086114 | 4/2011 |
| JP | 2012068854 | 4/2012 |
| JP | 201218583 | 9/2012 |
| JP | 2012185833 | 9/2012 |
| JP | 2012198916 | 10/2012 |
| JP | 2012208714 | 10/2012 |
| JP | 2013016060 | 1/2013 |
| JP | 2013037674 | 2/2013 |
| JP | 2013196047 | 9/2013 |
| JP | 2013251913 | 12/2013 |
| JP | 2014503873 | 2/2014 |
| JP | 2014532332 | 12/2014 |
| JP | 2015057263 | 3/2015 |
| JP | 2015509634 | 3/2015 |
| JP | 2021085256 | 6/2021 |
| KR | 1020080102516 | 11/2008 |
| KR | 100987650 | 10/2010 |
| KR | 20130137005 | 12/2013 |
| KR | 1020130137005 | 12/2013 |
| KR | 20140027837 | 3/2014 |
| KR | 1020140055985 | 5/2014 |
| KR | 20140138779 | 12/2014 |
| KR | 20150002718 | 1/2015 |
| KR | 101999712 | 1/2017 |
| KR | 101914850 | 10/2018 |
| TW | 201425974 | 7/2014 |
| WO | 9001895 | 3/1990 |
| WO | 0130123 | 4/2001 |
| WO | 2001027855 | 4/2001 |
| WO | 0175778 | 10/2001 |
| WO | 2002082999 | 10/2002 |
| WO | 2004004557 | 1/2004 |
| WO | 2004053601 | 6/2004 |
| WO | 2005103863 | 11/2005 |
| WO | 2007125298 | 11/2007 |
| WO | 2009032073 | 3/2009 |
| WO | 2009083467 | 7/2009 |
| WO | 2009148064 | 12/2009 |
| WO | 2010032173 | 3/2010 |
| WO | 2010101697 | 9/2010 |
| WO | 2012026013 | 3/2012 |
| WO | 2012064847 | 5/2012 |
| WO | 2012152476 | 11/2012 |
| WO | 2013082806 | 6/2013 |
| WO | 2013084108 | 6/2013 |
| WO | 2013137412 | 9/2013 |
| WO | 2013154864 | 10/2013 |
| WO | 2013186696 | 12/2013 |
| WO | 2013191657 | 12/2013 |
| WO | 2013192166 | 12/2013 |
| WO | 2014019085 | 2/2014 |
| WO | 2014032984 | 3/2014 |
| WO | 2014085369 | 6/2014 |
| WO | 2014116968 | 7/2014 |
| WO | 2014124520 | 8/2014 |
| WO | 2014136027 | 9/2014 |
| WO | 2014138280 | 9/2014 |
| WO | 2014160893 | 10/2014 |
| WO | 2014165476 | 10/2014 |
| WO | 2014204323 | 12/2014 |
| WO | 2015017931 | 2/2015 |
| WO | 2015018675 | 2/2015 |
| WO | 2015022671 | 2/2015 |
| WO | 2015149049 | 10/2015 |
| WO | 2016053624 | 4/2016 |
| WO | 2016118534 | 7/2016 |
| WO | 2016154560 | 9/2016 |
| WO | 2016154568 | 9/2016 |
| WO | 2016176471 | 11/2016 |
| WO | 2016176600 | 11/2016 |
| WO | 2016176606 | 11/2016 |
| WO | 2016178797 | 11/2016 |
| WO | 2017019299 | 2/2017 |
| WO | 2017062566 | 4/2017 |
| WO | 2017079484 | 5/2017 |
| WO | 2017200570 | 11/2017 |
| WO | 2017200571 | 11/2017 |
| WO | 20170200949 | 11/2017 |
| WO | 2018106306 | 6/2018 |

OTHER PUBLICATIONS

Kim et al. ("Human Activity Classification based on Micro-Doppler Signatures Using a Support Vector Machine," IEEE Transactions on Geoscience and Remote Sensing, vol. 47, No. 5, May 2009, pp. 1328-1337) (Year: 2009).*

Yinan Yang, Wenxue Zhang, Chao Lu, "Classify human motions using micro-Doppler radar," Proc. SPIE 6944, Biometric Technology for Human Identification V, 69440V (Mar. 17, 2008); https://doi.org/10.1117/12.779072 (Year: 2008).*

Fairchild, Dustin & Narayanan, Ram. (2016). Multistatic micro-doppler radar for determining target orientation and activity classification. IEEE Transactions on Aerospace and Electronic Systems. 52. 512-521. 10.1109/TAES.2015.130595. (Year: 2016).*

Dustin P. Fairchild and Ram M. Narayanan "Determining human target facing orientation using bistatic radar micro-Doppler signals", Proc. SPIE 9082, Active and Passive Signatures V, 908203 (Jun. 4, 2014); https://doi.org/10.1117/12.2047240 (Year: 2016).*

"Final Office Action", U.S. Appl. No. 17/394,241, filed May 22, 2024, 9 pages.

(56) References Cited

OTHER PUBLICATIONS

"Foreign Office Action", EP Application No. 21156948.8, Jun. 26, 2024, 3 pages.
"Non-Final Office Action", U.S. Appl. No. 18/495,648, filed May 31, 2024, 7 pages.
"Notice of Allowance", U.S. Appl. No. 18/312,509, filed Jun. 13, 2024, 8 pages.
"Notice of Allowance", U.S. Appl. No. 17/394,241, filed Jun. 24, 2024, 8 pages.
"Notice of Allowance", U.S. Appl. No. 18/495,648, filed Jul. 22, 2024, 8 pages.
"Non-Final Office Action", U.S. Appl. No. 18/312,509, filed Mar. 21, 2024, 7 pages.
"Non-Final Office Action", U.S. Appl. No. 18/312,509, filed Apr. 8, 2024, 7 pages.
Prasad, et al., "A Wireless Dynamic Gesture User Interface for HCI Using Hand Data Glove", Downloaded on Mar. 16, 2024 at 21:48:55 UTC from IEEE Xplore., Aug. 2014, 6 pages.
Tan, et al., "A Real-Time High Resolution Passive WiFi Doppler-Radar and Its Applications", Downloaded on Mar. 16, 2024 at 18:09:52 UTC from IEEE Xplore., Aug. 2014, 6 pages.
"Foreign Office Action", CN Application No. 202010090233.0, Dec. 28, 2023, 12 pages.
"Non-Final Office Action", U.S. Appl. No. 17/394,241, filed Dec. 18, 2023, 21 pages.
"Advisory Action", U.S. Appl. No. 16/689,519, filed Jun. 30, 2021, 2 pages.
"Advisory Action", U.S. Appl. No. 14/504,139, filed Aug. 28, 2017, 3 pages.
"Apple Watch Used Four Sensors to Detect your Pulse", Sep. 9, 2014, 4 pages.
"Cardiio", Retrieved From: <http://www.cardiio.com/> Apr. 15, 2015 App Information Retrieved From: <https://itunes.apple.com/us/app/cardiio-touchless-camera-pulse/id542891434?ls=1&mt=8> Apr. 15, 2015, Feb. 24, 2015, 6 pages.
"Clever Toilet Checks on Your Health", CNN.Com; Technology, Jun. 28, 2005, 2 pages.
"Combined Search and Examination Report", GB Application No. 1620892.8, Apr. 6, 2017, 5 pages.
"Combined Search and Examination Report", GB Application No. 1620891.0, May 31, 2017, 9 pages.
"EP Appeal Decision", EP Application No. 10194359.5, May 28, 2019, 20 pages.
"European Search Report", EP Application No. 16789735.4, Nov. 14, 2018, 4 pages.
"Extended European Search Report", EP Application No. 19164113.3, Jun. 13, 2019, 11 pages.
"Extended European Search Report", EP Application No. 15170577.9, Nov. 5, 2015, 12 pages.
"Extended European Search Report", EP Application No. 21156948.8, Aug. 27, 2021, 15 pages.
"Extended European Search Report", EP Application No. 19158625.4, May 8, 2019, 16 pages.
"Final Office Action", U.S. Appl. No. 15/462,957, filed Nov. 8, 2019, 10 Pages.
"Final Office Action", U.S. Appl. No. 14/504,061, filed Mar. 9, 2016, 10 pages.
"Final Office Action", U.S. Appl. No. 14/681,625, filed Dec. 7, 2016, 10 pages.
"Final Office Action", U.S. Appl. No. 15/287,253, filed Apr. 2, 2019, 10 pages.
"Final Office Action", U.S. Appl. No. 15/398,147, filed Jun. 30, 2017, 11 pages.
"Final Office Action", U.S. Appl. No. 15/287,155, filed Apr. 10, 2019, 11 pages.
"Final Office Action", U.S. Appl. No. 17/023,122, filed Apr. 7, 2022, 12 pages.
"Final Office Action", U.S. Appl. No. 14/959,799, filed Jul. 19, 2017, 12 pages.
"Final Office Action", U.S. Appl. No. 14/731,195, filed Oct. 11, 2018, 12 pages.
"Final Office Action", U.S. Appl. No. 16/689,519, filed Apr. 29, 2021, 13 pages.
"Final Office Action", U.S. Appl. No. 15/595,649, filed May 23, 2018, 13 pages.
"Final Office Action", U.S. Appl. No. 14/715,454, filed Sep. 7, 2017, 14 pages.
"Final Office Action", U.S. Appl. No. 16/503,234, filed Dec. 30, 2020, 14 pages.
"Final Office Action", U.S. Appl. No. 14/504,139, filed May 1, 2018, 14 pages.
"Final Office Action", U.S. Appl. No. 15/286,512, filed Dec. 26, 2018, 15 pages.
"Final Office Action", U.S. Appl. No. 15/142,619, filed Feb. 8, 2018, 15 pages.
"Final Office Action", U.S. Appl. No. 16/238,464, filed Jul. 25, 2019, 15 pages.
"Final Office Action", U.S. Appl. No. 15/287,359, filed Feb. 19, 2020, 16 Pages.
"Final Office Action", U.S. Appl. No. 14/504,121, filed Aug. 8, 2017, 16 pages.
"Final Office Action", U.S. Appl. No. 14/959,730, filed Nov. 22, 2017, 16 pages.
"Final Office Action", U.S. Appl. No. 15/142,689, filed Jun. 1, 2018, 16 pages.
"Final Office Action", U.S. Appl. No. 14/959,799, filed Jan. 4, 2018, 17 pages.
"Final Office Action", U.S. Appl. No. 14/720,632, filed Jan. 9, 2018, 18 pages.
"Final Office Action", U.S. Appl. No. 14/518,863, filed May 5, 2017, 18 pages.
"Final Office Action", U.S. Appl. No. 14/959,901, filed May 30, 2019, 18 pages.
"Final Office Action", U.S. Appl. No. 14/959,901, filed Aug. 25, 2017, 19 pages.
"Final Office Action", U.S. Appl. No. 15/093,533, filed Mar. 21, 2018, 19 pages.
"Final Office Action", U.S. Appl. No. 14/715,454, filed Apr. 17, 2018, 19 pages.
"Final Office Action", U.S. Appl. No. 15/286,537, filed Apr. 19, 2019, 21 pages.
"Final Office Action", U.S. Appl. No. 14/518,863, filed Apr. 5, 2018, 21 pages.
"Final Office Action", U.S. Appl. No. 15/596,702, filed Jun. 13, 2019, 21 pages.
"Final Office Action", U.S. Appl. No. 14/959,901, filed Jun. 15, 2018, 21 pages.
"Final Office Action", U.S. Appl. No. 15/287,308, filed Feb. 8, 2019, 23 pages.
"Final Office Action", U.S. Appl. No. 14/599,954, filed Aug. 10, 2016, 23 pages.
"Final Office Action", U.S. Appl. No. 14/504,038, filed Sep. 27, 2016, 23 pages.
"Final Office Action", U.S. Appl. No. 14/504,121, filed Jul. 9, 2018, 23 pages.
"Final Office Action", U.S. Appl. No. 15/286,152, filed Jun. 26, 2018, 25 pages.
"Final Office Action", U.S. Appl. No. 15/142,471, filed Jun. 20, 2019, 26 pages.
"Final Office Action", U.S. Appl. No. 15/596,702, filed Apr. 14, 2020, 27 Pages.
"Final Office Action", U.S. Appl. No. 15/403,066, filed Oct. 5, 2017, 31 pages.
"Final Office Action", U.S. Appl. No. 15/267,181, filed Jun. 7, 2018, 31 pages.
"Final Office Action", U.S. Appl. No. 14/312,486, filed Jun. 3, 2016, 32 pages.
"Final Office Action", U.S. Appl. No. 15/166,198, filed Sep. 27, 2018, 33 pages.
"Final Office Action", U.S. Appl. No. 15/287,394, filed Sep. 30, 2019, 38 Pages.

(56) References Cited

OTHER PUBLICATIONS

"Final Office Action", U.S. Appl. No. 14/699,181, filed May 4, 2018, 41 pages.
"Final Office Action", U.S. Appl. No. 14/715,793, filed Sep. 12, 2017, 7 pages.
"Final Office Action", U.S. Appl. No. 14/809,901, filed Dec. 13, 2018, 7 pages.
"Final Office Action", KR Application No. 10-2016-7036023, filed Feb. 19, 2018, 8 pages.
"Final Office Action", U.S. Appl. No. 14/874,955, filed Jun. 30, 2017, 9 pages.
"Final Office Action", U.S. Appl. No. 14/874,955, filed Jun. 11, 2018, 9 pages.
"First Action Interview OA", U.S. Appl. No. 14/715,793, filed Jun. 21, 2017, 3 pages.
"First Action Interview Office Action", U.S. Appl. No. 15/142,471, filed Feb. 5, 2019, 29 pages.
"First Action Interview Office Action", U.S. Appl. No. 14/959,901, filed Apr. 14, 2017, 3 pages.
"First Action Interview Office Action", U.S. Appl. No. 14/731,195, filed Jun. 21, 2018, 4 pages.
"First Action Interview Office Action", U.S. Appl. No. 15/286,152, filed Mar. 1, 2018, 5 pages.
"First Action Interview Office Action", U.S. Appl. No. 15/917,238, filed Jun. 6, 2019, 6 pages.
"First Action Interview Office Action", U.S. Appl. No. 15/166,198, filed Apr. 25, 2018, 8 pages.
"First Action Interview Pilot Program Pre-Interview Communication", U.S. Appl. No. 14/731,195, filed Aug. 1, 2017, 3 pages.
"First Exam Report", EP Application No. 15754352.1, Mar. 5, 2018, 7 pages.
"First Examination Report", GB Application No. 1621332.4, May 16, 2017, 7 pages.
"Foreign Notice of Allowance", KR Application No. 10-2021-7009474, Sep. 2, 2021, 2 pages.
"Foreign Office Action", KR Application No. 10-2018-7029464, Oct. 30, 2018, 1 page.
"Foreign Office Action", CN Application No. 202010090233.0, Mar. 31, 2023, 10 pages.
"Foreign Office Action", KR Application No. 10-2016-7036023, Aug. 11, 2017, 10 pages.
"Foreign Office Action", CN Application No. 201680020123.9, Nov. 29, 2019, 10 pages.
"Foreign Office Action", CN Application No. 201580034908.7, Feb. 19, 2019, 10 pages.
"Foreign Office Action", CN Application No. 201611191179.9, Aug. 28, 2019, 10 pages.
"Foreign Office Action", KR Application No. 10-2021-7007454, Apr. 29, 2021, 11 pages.
"Foreign Office Action", CN Application No. 201710922856.8, Jun. 19, 2020, 11 pages.
"Foreign Office Action", JP Application No. 2018-501256, Jul. 24, 2018, 11 pages.
"Foreign Office Action", JP Application No. 2019-078554, Jul. 21, 2020, 12 pages.
"Foreign Office Action", KR Application No. 10-2016-7036396, Jan. 3, 2018, 12 pages.
"Foreign Office Action", CN Application No. 201580036075.8, Jul. 4, 2018, 14 page.
"Foreign Office Action", EP Application No. 16725269.1, Nov. 26, 2018, 14 pages.
"Foreign Office Action", CN Application No. 201680021212.5, Sep. 3, 2019, 14 pages.
"Foreign Office Action", JP Application No. 2016-563979, Sep. 21, 2017, 15 pages.
"Foreign Office Action", KR Application No. 10-2018-7027694, Nov. 23, 2018, 15 pages.
"Foreign Office Action", CN Application No. 201611159870.9, Dec. 17, 2019, 15 pages.
"Foreign Office Action", EP Application No. 16725269.1, Mar. 24, 2020, 15 pages.
"Foreign Office Action", CN Application No. 201580034908.7, Jul. 3, 2018, 17 pages.
"Foreign Office Action", CN Application No. 201510300495.4, Jun. 21, 2018, 18 pages.
"Foreign Office Action", CN Application No. 201680020567.2, Sep. 26, 2019, 19 pages.
"Foreign Office Action", KR Application No. 10-2019-7004803, Oct. 14, 2019, 2 pages.
"Foreign Office Action", KR Application No. 10-2019-7004803, Dec. 6, 2019, 2 pages.
"Foreign Office Action", CN Application No. 201611159602.7, Oct. 11, 2019, 20 pages.
"Foreign Office Action", CN Application No. 201580035246.5, Jan. 31, 2019, 22 pages.
"Foreign Office Action", CN Application No. 201680021213.X, Oct. 28, 2019, 26 pages.
"Foreign Office Action", EP Application No. 16725269.1, Feb. 9, 2021, 26 pages.
"Foreign Office Action", CN Application No. 201680038897.4, Jun. 29, 2020, 28 pages.
"Foreign Office Action", JP Application No. 2018156138, May 22, 2019, 3 pages.
"Foreign Office Action", JP Application No. 2018156138, Sep. 30, 2019, 3 pages.
"Foreign Office Action", KR Application No. 10-2016-7036015, Oct. 15, 2018, 3 pages.
"Foreign Office Action", GB Application No. 1621332.4, Nov. 6, 2019, 3 pages.
"Foreign Office Action", JP Application No. 2018501256, Feb. 26, 2019, 3 pages.
"Foreign Office Action", JP Application No. 2018156138, Apr. 22, 2020, 3 pages.
"Foreign Office Action", JP Application No. 2016-567839, Apr. 3, 2018, 3 pages.
"Foreign Office Action", JP Application No. 2018-021296, Apr. 9, 2019, 3 pages.
"Foreign Office Action", EP Application No. 16784352.3, May 16, 2018, 3 pages.
"Foreign Office Action", JP Application No. 2016-563979, May 21, 2018, 3 pages.
"Foreign Office Action", CN Application No. 201721290290.3, Jun. 6, 2018, 3 pages.
"Foreign Office Action", EP Application No. 15170577.9, Dec. 21, 2018, 31 pages.
"Foreign Office Action", JP Application No. 2016-575564, Jan. 10, 2019, 4 pages.
"Foreign Office Action", CN Application No. 201721290290.3, Mar. 9, 2018, 4 pages.
"Foreign Office Action", KR Application No. 10-2016-7036023, Apr. 12, 2018, 4 pages.
"Foreign Office Action", JP Application No. 2016-575564, Jul. 10, 2018, 4 pages.
"Foreign Office Action", KR Application No. 10-2021-7009474, May 10, 2021, 5 pages.
"Foreign Office Action", GB Application No. 1621192.2, Jun. 17, 2020, 5 pages.
"Foreign Office Action", KR Application No. 10-2016-7035397, Sep. 20, 2017, 5 pages.
"Foreign Office Action", JP Application No. 2018169008, Jan. 14, 2020, 5 pages.
"Foreign Office Action", JP Application No. 2018501256, Oct. 23, 2019, 5 pages.
"Foreign Office Action", KR Application No. 10-2017-7027877, Nov. 23, 2018, 5 pages.
"Foreign Office Action", JP Application No. 2017-541972, Nov. 27, 2018, 5 pages.
"Foreign Office Action", EP Application No. 15754352.1, Nov. 7, 2018, 5 pages.
"Foreign Office Action", EP Application No. 16789735.4, Dec. 12, 2018, 5 pages.

(56) References Cited

OTHER PUBLICATIONS

"Foreign Office Action", JP Application No. 2016-575564, Dec. 5, 2017, 5 pages.
"Foreign Office Action", GB Application No. 1620891.0, Dec. 6, 2018, 5 pages.
"Foreign Office Action", CN Application No. 201580036075.8, Feb. 19, 2019, 5 pages.
"Foreign Office Action", JP Application No. 2016-563979, Feb. 7, 2018, 5 pages.
"Foreign Office Action", GB Application No. 1912334.8, Sep. 23, 2019, 5 pages.
"Foreign Office Action", EP Application No. 16724775.8, May 27, 2021, 6 pages.
"Foreign Office Action", KR Application No. 10-2019-7019768, Sep. 30, 2019, 6 pages.
"Foreign Office Action", JP Application No. 2016-567813, Jan. 16, 2018, 6 pages.
"Foreign Office Action", CN Application No. 201580034536.8, Oct. 9, 2018, 6 pages.
"Foreign Office Action", KR Application No. 10-2017-7027871, Nov. 23, 2018, 6 pages.
"Foreign Office Action", KR Application No. 10-2021-7037016, Dec. 23, 2021, 6 pages.
"Foreign Office Action", CN Application No. 201510300495.4, Apr. 10, 2019, 6 pages.
"Foreign Office Action", KR Application No. 10-2019-7004803, Apr. 26, 2019, 6 pages.
"Foreign Office Action", KR Application No. 1020187012629, May 24, 2018, 6 pages.
"Foreign Office Action", EP Application No. 15170577.9, May 30, 2017, 7 pages.
"Foreign Office Action", KR Application No. 1020197023675, Jul. 13, 2020, 7 pages.
"Foreign Office Action", KR Application No. 2019-7020454, Aug. 26, 2020, 7 pages.
"Foreign Office Action", EP Application No. 16716351.8, Mar. 15, 2019, 7 pages.
"Foreign Office Action", CN Application No. 201680021213.X, Aug. 27, 2020, 7 pages.
"Foreign Office Action", JP Application No. 2016-567813, Sep. 22, 2017, 8 pages.
"Foreign Office Action", KR Application No. 1020187004283, Jan. 3, 2020, 8 pages.
"Foreign Office Action", JP Application No. 2018021296, Dec. 25, 2018, 8 pages.
"Foreign Office Action", EP Application No. 15754323.2, Mar. 9, 2018, 8 pages.
"Foreign Office Action", EP Application No. 16724775.8, Nov. 23, 2018, 9 pages.
"Foreign Office Action", KR Application No. 10-2016-7032967English Translation, Sep. 14, 2017, 4 pages.
"Foreign Office Acton", EP Application No. 21156948.8, May 21, 2021, 15 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Preliminary Report on Patentability", Application No. PCT/US2017/051663, Jun. 20, 2019, 10 pages.
"International Preliminary Report on Patentability", Application No. PCT/US2016/063874, Nov. 29, 2018, 12 pages.
"International Preliminary Report on Patentability", Application No. PCT/US2015/030388, Dec. 15, 2016, 12 pages.
"International Preliminary Report on Patentability", Application No. PCT/US2015/043963, Feb. 16, 2017, 12 pages.
"International Preliminary Report on Patentability", Application No. PCT/US2015/050903, Apr. 13, 2017, 12 pages.
"International Preliminary Report on Patentability", Application No. PCT/US2015/043949, Feb. 16, 2017, 13 pages.
"International Preliminary Report on Patentability", Application No. PCT/US2017/032733, Nov. 29, 2018, 7 pages.
"International Preliminary Report on Patentability", Application No. PCT/US2016/026756, Oct. 19, 2017, 8 pages.
"International Preliminary Report on Patentability", Application No. PCT/US2015/044774, Mar. 2, 2017, 8 pages.
"International Search Report and Written Opinion", Application No. PCT/US2016/060399, Jan. 30, 2017, 11 pages.
"International Search Report and Written Opinion", Application No. PCT/US2016/065295, Mar. 14, 2017, 12 pages.
"International Search Report and Written Opinion", Application No. PCT/US2015/044774, Nov. 3, 2015, 12 pages.
"International Search Report and Written Opinion", Application No. PCT/US2016/042013, Oct. 26, 2016, 12 pages.
"International Search Report and Written Opinion", Application No. PCT/US2016/062082, Feb. 23, 2017, 12 pages.
"International Search Report and Written Opinion", Application No. PCT/US2017/047691, Nov. 16, 2017, 13 pages.
"International Search Report and Written Opinion", Application No. PCT/US2016/024267, Jun. 20, 2016, 13 pages.
"International Search Report and Written Opinion", Application No. PCT/US2016/024273, Jun. 20, 2016, 13 pages.
"International Search Report and Written Opinion", Application No. PCT/US2016/032307, Aug. 25, 2016, 13 pages.
"International Search Report and Written Opinion", Application No. PCT/US2016/034366, Nov. 17, 2016, 13 pages.
"International Search Report and Written Opinion", Application No. PCT/US2016/029820, Jul. 15, 2016, 14 pages.
"International Search Report and Written Opinion", Application No. PCT/US2016/055671, Dec. 1, 2016, 14 pages.
"International Search Report and Written Opinion", Application No. PCT/US2016/030177, Aug. 2, 2016, 15 pages.
"International Search Report and Written Opinion", Application No. PCT/US2017/051663, Nov. 29, 2017, 16 pages.
"International Search Report and Written Opinion", Application No. PCT/US2015/043963, Nov. 24, 2015, 16 pages.
"International Search Report and Written Opinion", Application No. PCT/US2016/024289, Aug. 25, 2016, 17 pages.
"International Search Report and Written Opinion", Application No. PCT/US2015/043949, Dec. 1, 2015, 18 pages.
"International Search Report and Written Opinion", Application No. PCT/US2015/050903, Feb. 19, 2016, 18 pages.
"International Search Report and Written Opinion", Application No. PCT/US2016/030115, Aug. 8, 2016, 18 pages.
"International Search Report and Written Opinion", Application No. PCT/US2016/063874, May 11, 2017, 19 pages.
"International Search Report and Written Opinion", Application No. PCT/US2016/033342, Oct. 27, 2016, 20 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 15/596,702, filed Jan. 4, 2019, 10 pages.
"Non-Final Office Action", U.S. Appl. No. 17/023,122, filed Sep. 16, 2022, 10 pages.
"Non-Final Office Action", U.S. Appl. No. 16/153,395, filed Oct. 22, 2019, 10 Pages.
"Non-Final Office Action", U.S. Appl. No. 15/286,837, filed Oct. 26, 2018, 10 pages.
"Non-Final Office Action", U.S. Appl. No. 14/504,139, filed Jan. 27, 2017, 10 pages.
"Non-Final Office Action", U.S. Appl. No. 14/959,799, filed Jan. 27, 2017, 10 pages.
"Non-Final Office Action", U.S. Appl. No. 15/398,147, filed Mar. 9, 2017, 10 pages.
"Non-Final Office Action", U.S. Appl. No. 16/843,813, filed Mar. 18, 2021, 12 pages.
"Non-Final Office Action", U.S. Appl. No. 14/504,139, filed Oct. 18, 2017, 12 pages.
"Non-Final Office Action", U.S. Appl. No. 15/287,155, filed Dec. 10, 2018, 12 pages.

(56) References Cited

OTHER PUBLICATIONS

"Non-Final Office Action", U.S. Appl. No. 14/666,155, filed Feb. 3, 2017, 12 pages.
"Non-Final Office Action", U.S. Appl. No. 15/424,263, filed May 23, 2019, 12 pages.
"Non-Final Office Action", U.S. Appl. No. 16/669,842, filed Sep. 3, 2020, 12 pages.
"Non-Final Office Action", U.S. Appl. No. 16/252,477, filed Jan. 10, 2020, 13 Pages.
"Non-Final Office Action", U.S. Appl. No. 14/504,121, filed Jan. 9, 2017, 13 pages.
"Non-Final Office Action", U.S. Appl. No. 14/809,901, filed May 24, 2018, 13 pages.
"Non-Final Office Action", U.S. Appl. No. 14/959,730, filed Jun. 23, 2017, 14 pages.
"Non-Final Office Action", U.S. Appl. No. 15/462,957, filed May 24, 2019, 14 pages.
"Non-Final Office Action", U.S. Appl. No. 14/862,409, filed Jun. 22, 2017, 15 pages.
"Non-Final Office Action", U.S. Appl. No. 14/930,220, filed Sep. 14, 2016, 15 pages.
"Non-Final Office Action", U.S. Appl. No. 16/238,464, filed Mar. 7, 2019, 15 pages.
"Non-Final Office Action", U.S. Appl. No. 15/286,512, filed Jul. 19, 2018, 15 pages.
"Non-Final Office Action", U.S. Appl. No. 15/142,829, filed Aug. 16, 2018, 15 pages.
"Non-Final Office Action", U.S. Appl. No. 14/720,632, filed Jun. 14, 2017, 16 pages.
"Non-Final Office Action", U.S. Appl. No. 15/142,619, filed Aug. 25, 2017, 16 pages.
"Non-Final Office Action", U.S. Appl. No. 14/959,799, filed Sep. 8, 2017, 16 pages.
"Non-Final Office Action", U.S. Appl. No. 14/715,454, filed Jan. 11, 2018, 16 pages.
"Non-Final Office Action", U.S. Appl. No. 15/595,649, filed Oct. 31, 2017, 16 pages.
"Non-Final Office Action", U.S. Appl. No. 14/504,139, filed Oct. 5, 2018, 16 pages.
"Non-Final Office Action", U.S. Appl. No. 14/518,863, filed Oct. 14, 2016, 16 pages.
"Non-Final Office Action", U.S. Appl. No. 14/599,954, filed Jan. 26, 2017, 16 pages.
"Non-Final Office Action", U.S. Appl. No. 16/822,601, filed Mar. 15, 2021, 17 pages.
"Non-Final Office Action", U.S. Appl. No. 16/503,234, filed Mar. 18, 2021, 17 pages.
"Non-Final Office Action", U.S. Appl. No. 14/862,409, filed Dec. 14, 2017, 17 pages.
"Non-Final Office Action", U.S. Appl. No. 14/599,954, filed Feb. 2, 2016, 17 pages.
"Non-Final Office Action", U.S. Appl. No. 15/287,253, filed Apr. 5, 2018, 17 pages.
"Non-Final Office Action", U.S. Appl. No. 16/503,234, filed Aug. 5, 2020, 18 Pages.
"Non-Final Office Action", U.S. Appl. No. 15/093,533, filed Aug. 24, 2017, 18 pages.
"Non-Final Office Action", U.S. Appl. No. 15/142,689, filed Oct. 4, 2017, 18 pages.
"Non-Final Office Action", U.S. Appl. No. 15/287,308, filed Oct. 15, 2018, 18 pages.
"Non-Final Office Action", U.S. Appl. No. 15/286,537, filed Nov. 19, 2018, 18 pages.
"Non-Final Office Action", U.S. Appl. No. 15/287,359, filed Jun. 26, 2020, 19 Pages.
"Non-Final Office Action", U.S. Appl. No. 14/504,121, filed Jan. 2, 2018, 19 pages.
"Non-Final Office Action", U.S. Appl. No. 15/287,359, filed Oct. 28, 2020, 19 pages.
"Non-Final Office Action", U.S. Appl. No. 15/287,253, filed Sep. 7, 2018, 20 pages.
"Non-Final Office Action", U.S. Appl. No. 14/518,863, filed Sep. 29, 2017, 20 pages.
"Non-Final Office Action", U.S. Appl. No. 14/720,632, filed May 18, 2018, 20 pages.
"Non-Final Office Action", U.S. Appl. No. 14/959,901, filed Jan. 8, 2018, 21 pages.
"Non-Final Office Action", U.S. Appl. No. 15/596,702, filed Oct. 21, 2019, 21 Pages.
"Non-Final Office Action", U.S. Appl. No. 15/704,825, filed Jun. 1, 2020, 22 Pages.
"Non-Final Office Action", U.S. Appl. No. 15/791,044, filed Sep. 30, 2019, 22 Pages.
"Non-Final Office Action", U.S. Appl. No. 14/959,901, filed Oct. 11, 2018, 22 pages.
"Non-Final Office Action", U.S. Appl. No. 16/689,519, filed Oct. 20, 2020, 22 pages.
"Non-Final Office Action", U.S. Appl. No. 14/504,038, filed Feb. 26, 2016, 22 pages.
"Non-Final Office Action", U.S. Appl. No. 17/005,207, filed Apr. 1, 2021, 23 pages.
"Non-Final Office Action", U.S. Appl. No. 17/023,122, filed Jan. 24, 2022, 25 pages.
"Non-Final Office Action", U.S. Appl. No. 14/312,486, filed Oct. 23, 2015, 25 pages.
"Non-Final Office Action", U.S. Appl. No. 15/286,152, filed Oct. 19, 2018, 27 pages.
"Non-Final Office Action", U.S. Appl. No. 15/286,537, filed Sep. 3, 2019, 28 Pages.
"Non-Final Office Action", U.S. Appl. No. 15/704,615, filed Jun. 1, 2020, 29 Pages.
"Non-Final Office Action", U.S. Appl. No. 15/267,181, filed Feb. 8, 2018, 29 pages.
"Non-Final Office Action", U.S. Appl. No. 15/403,066, filed May 4, 2017, 31 pages.
"Non-Final Office Action", U.S. Appl. No. 14/699,181, filed Oct. 18, 2017, 33 pages.
"Non-Final Office Action", U.S. Appl. No. 14/504,038, filed Mar. 22, 2017, 33 pages.
"Non-Final Office Action", U.S. Appl. No. 16/875,427, filed Oct. 5, 2021, 37 pages.
"Non-Final Office Action", U.S. Appl. No. 15/287,394, filed Mar. 22, 2019, 39 pages.
"Non-Final Office Action", U.S. Appl. No. 15/166,198, filed Feb. 21, 2019, 48 pages.
"Non-Final Office Action", U.S. Appl. No. 17/517,978, filed Apr. 24, 2023, 6 pages.
"Non-Final Office Action", U.S. Appl. No. 17/119,312, filed Sep. 2, 2022, 6 pages.
"Non-Final Office Action", U.S. Appl. No. 17/506,605, filed Jul. 27, 2022, 7 pages.
"Non-Final Office Action", U.S. Appl. No. 15/398,147, filed Sep. 8, 2017, 7 pages.
"Non-Final Office Action", U.S. Appl. No. 14/874,955, filed Feb. 8, 2018, 7 pages.
"Non-Final Office Action", U.S. Appl. No. 14/681,625, filed Mar. 6, 2017, 7 pages.
"Non-Final Office Action", U.S. Appl. No. 15/586,174, filed Jun. 18, 2018, 7 pages.
"Non-Final Office Action", U.S. Appl. No. 14/504,061, filed Nov. 4, 2015, 8 pages.
"Non-Final Office Action", U.S. Appl. No. 14/874,955, filed Feb. 27, 2017, 8 pages.
"Non-Final Office Action", U.S. Appl. No. 14/513,875, filed Feb. 21, 2017, 9 pages.
"Non-Final Office Action", U.S. Appl. No. 16/744,626, filed Sep. 23, 2020, 9 Pages.
"Non-Final Office Action", U.S. Appl. No. 14/582,896, filed Jun. 29, 2016, 9 pages.
"Non-Final Office Action", U.S. Appl. No. 14/681,625, filed Aug. 12, 2016, 9 pages.

(56) References Cited

OTHER PUBLICATIONS

"Non-Final Office Action", U.S. Appl. No. 14/666,155, filed Aug. 24, 2016, 9 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; as cited in the search report for PCT/US2016/013968 citing the whole document, but in particular the abstract, May 29, 2009, 2 pages.
"Notice of Allowability", U.S. Appl. No. 16/560,085, filed Nov. 12, 2020, 2 pages.
"Notice of Allowance", U.S. Appl. No. 16/744,626, filed Jan. 1, 2021, 10 pages.
"Notice of Allowance", U.S. Appl. No. 16/238,464, filed Nov. 4, 2019, 10 Pages.
"Notice of Allowance", U.S. Appl. No. 15/424,263, filed Nov. 14, 2019, 10 Pages.
"Notice of Allowance", U.S. Appl. No. 15/287,394, filed Mar. 4, 2020, 11 Pages.
"Notice of Allowance", U.S. Appl. No. 14/599,954, filed May 24, 2017, 11 pages.
"Notice of Allowance", U.S. Appl. No. 16/153,395, filed Feb. 20, 2020, 13 Pages.
"Notice of Allowance", U.S. Appl. No. 16/875,427, filed Feb. 22, 2022, 13 pages.
"Notice of Allowance", U.S. Appl. No. 15/917,238, filed Aug. 21, 2019, 13 pages.
"Notice of Allowance", U.S. Appl. No. 15/287,253, filed Aug. 26, 2019, 13 Pages.
"Notice of Allowance", U.S. Appl. No. 15/286,512, filed Apr. 9, 2019, 14 pages.
"Notice of Allowance", U.S. Appl. No. 14/312,486, filed Oct. 7, 2016, 15 pages.
"Notice of Allowance", U.S. Appl. No. 16/401,611, filed Jun. 10, 2020, 17 Pages.
"Notice of Allowance", U.S. Appl. No. 15/287,308, filed Jul. 17, 2019, 17 Pages.
"Notice of Allowance", U.S. Appl. No. 14/504,038, filed Aug. 7, 2017, 17 pages.
"Notice of Allowance", U.S. Appl. No. 15/403,066, filed Jan. 8, 2018, 18 pages.
"Notice of Allowance", U.S. Appl. No. 15/287,200, filed Nov. 6, 2018, 19 pages.
"Notice of Allowance", U.S. Appl. No. 15/286,152, filed Mar. 5, 2019, 23 pages.
"Notice of Allowance", U.S. Appl. No. 16/356,748, filed Feb. 11, 2020, 5 Pages.
"Notice of Allowance", U.S. Appl. No. 17/523,051, filed Feb. 28, 2023, 5 pages.
"Notice of Allowance", U.S. Appl. No. 17/488,015, filed Mar. 1, 2023, 5 pages.
"Notice of Allowance", U.S. Appl. No. 17/500,747, filed Mar. 1, 2023, 5 pages.
"Notice of Allowance", U.S. Appl. No. 14/715,793, filed Jul. 6, 2018, 5 pages.
"Notice of Allowance", U.S. Appl. No. 17/005,207, filed Jul. 14, 2021, 5 pages.
"Notice of Allowance", U.S. Appl. No. 15/093,533, filed Jul. 16, 2020, 5 Pages.
"Notice of Allowance", U.S. Appl. No. 15/286,495, filed Jan. 17, 2019, 5 pages.
"Notice of Allowance", U.S. Appl. No. 15/595,649, filed Jan. 3, 2019, 5 pages.
"Notice of Allowance", U.S. Appl. No. 14/715,793, filed Dec. 18, 2017, 5 pages.
"Notice of Allowance", U.S. Appl. No. 14/666,155, filed Feb. 20, 2018, 5 pages.
"Notice of Allowance", U.S. Appl. No. 14/582,896, filed Nov. 7, 2016, 5 pages.
"Notice of Allowance", U.S. Appl. No. 15/703,511, filed Apr. 16, 2019, 5 pages.
"Notice of Allowance", U.S. Appl. No. 15/586,174, filed Sep. 24, 2018, 5 pages.
"Notice of Allowance", U.S. Appl. No. 15/287,359, filed Apr. 14, 2021, 7 pages.
"Notice of Allowance", U.S. Appl. No. 14/513,875, filed Jun. 28, 2017, 7 pages.
"Notice of Allowance", U.S. Appl. No. 14/666,155, filed Jul. 10, 2017, 7 pages.
"Notice of Allowance", U.S. Appl. No. 16/389,402, filed Aug. 21, 2019, 7 Pages.
"Notice of Allowance", U.S. Appl. No. 16/380,245, filed Sep. 15, 2020, 7 Pages.
"Notice of Allowance", U.S. Appl. No. 14/874,955, filed Oct. 20, 2017, 7 pages.
"Notice of Allowance", U.S. Appl. No. 14/504,061, filed Sep. 12, 2016, 7 pages.
"Notice of Allowance", U.S. Appl. No. 14/494,863, filed May 30, 2017, 7 pages.
"Notice of Allowance", U.S. Appl. No. 14/681,625, filed Jun. 7, 2017, 7 pages.
"Notice of Allowance", U.S. Appl. No. 15/286,837, filed Mar. 6, 2019, 7 pages.
"Notice of Allowance", U.S. Appl. No. 14/731,195, filed Apr. 24, 2019, 7 pages.
"Notice of Allowance", U.S. Appl. No. 14/862,409, filed Jun. 6, 2018, 7 pages.
"Notice of Allowance", U.S. Appl. No. 15/287,155, filed Jul. 25, 2019, 7 pages.
"Notice of Allowance", U.S. Appl. No. 15/462,957, filed Jan. 23, 2020, 8 Pages.
"Notice of Allowance", U.S. Appl. No. 15/791,044, filed Feb. 12, 2020, 8 Pages.
"Notice of Allowance", U.S. Appl. No. 14/504,121, filed Jun. 1, 2021, 8 pages.
"Notice of Allowance", U.S. Appl. No. 16/503,234, filed Jun. 11, 2021, 8 pages.
"Notice of Allowance", U.S. Appl. No. 16/252,477, filed Jun. 24, 2020, 8 Pages.
"Notice of Allowance", U.S. Appl. No. 16/843,813, filed Jun. 30, 2021, 8 pages.
"Notice of Allowance", U.S. Appl. No. 17/517,978, filed Jun. 30, 2023, 8 pages.
"Notice of Allowance", U.S. Appl. No. 15/362,359, filed Aug. 3, 2018, 8 pages.
"Notice of Allowance", U.S. Appl. No. 17/148,374, filed Oct. 14, 2021, 8 pages.
"Notice of Allowance", U.S. Appl. No. 16/560,085, filed Oct. 19, 2020, 8 pages.
"Notice of Allowance", U.S. Appl. No. 14/681,625, filed Oct. 23, 2017, 8 pages.
"Notice of Allowance", U.S. Appl. No. 14/874,955, filed Oct. 4, 2018, 8 pages.
"Notice of Allowance", U.S. Appl. No. 15/398,147, filed Nov. 15, 2017, 8 pages.
"Notice of Allowance", U.S. Appl. No. 16/669,842, filed Dec. 18, 2020, 8 pages.
"Notice of Allowance", U.S. Appl. No. 14/959,730, filed Feb. 22, 2018, 8 pages.
"Notice of Allowance", U.S. Appl. No. 15/142,829, filed Feb. 6, 2019, 8 pages.
"Notice of Allowance", U.S. Appl. No. 14/930,220, filed Feb. 2, 2017, 8 pages.
"Notice of Allowance", U.S. Appl. No. 15/352,194, filed Jun. 26, 2019, 8 pages.
"Notice of Allowance", U.S. Appl. No. 15/595,649, filed Sep. 14, 2018, 8 pages.
"Notice of Allowance", U.S. Appl. No. 17/023,122, filed Mar. 6, 2023, 9 pages.
"Notice of Allowance", U.S. Appl. No. 17/361,824, filed Jun. 9, 2022, 9 pages.
"Notice of Allowance", U.S. Appl. No. 16/563,124, filed Jul. 8, 2021, 9 pages.

(56) References Cited

OTHER PUBLICATIONS

"Notice of Allowance", U.S. Appl. No. 15/343,067, filed Jul. 27, 2017, 9 pages.
"Notice of Allowance", U.S. Appl. No. 16/822,601, filed Aug. 5, 2021, 9 pages.
"Notice of Allowance", U.S. Appl. No. 16/689,519, filed Sep. 30, 2021, 9 pages.
"Notice of Allowance", U.S. Appl. No. 16/356,748, filed Oct. 17, 2019, 9 Pages.
"Notice of Allowance", U.S. Appl. No. 15/142,689, filed Oct. 30, 2018, 9 pages.
"Notice of Allowance", U.S. Appl. No. 14/504,137, filed Feb. 6, 2019, 9 pages.
"Notice of Allowance", U.S. Appl. No. 14/599,954, filed Mar. 15, 2018, 9 pages.
"Notice of Allowance", U.S. Appl. No. 15/142,619, filed Aug. 13, 2018, 9 pages.
"Patent Board Decision", U.S. Appl. No. 14/504,121, filed May 20, 20201, 9 pages.
"Philips Vital Signs Camera", Retrieved From: <http://www.vitalsignscamera.com/> Apr. 15, 2015, Jul. 17, 2013, 2 pages.
"Pre-Interview Communication", U.S. Appl. No. 15/287,359, filed Jul. 24, 2018, 2 pages.
"Pre-Interview Communication", U.S. Appl. No. 16/380,245, filed Jun. 15, 2020, 3 Pages.
"Pre-Interview Communication", U.S. Appl. No. 14/513,875, filed Oct. 21, 2016, 3 pages.
"Pre-Interview Communication", U.S. Appl. No. 15/142,471, filed Dec. 12, 2018, 3 pages.
"Pre-Interview Communication", U.S. Appl. No. 14/715,793, filed Mar. 20, 2017, 3 pages.
"Pre-Interview Communication", U.S. Appl. No. 14/715,454, filed Apr. 14, 2017, 3 pages.
"Pre-Interview Communication", U.S. Appl. No. 15/343,067, filed Apr. 19, 2017, 3 pages.
"Pre-Interview Communication", U.S. Appl. No. 16/401,611, filed Apr. 13, 2020, 4 Pages.
"Pre-Interview Communication", U.S. Appl. No. 15/286,495, filed Sep. 10, 2018, 4 pages.
"Pre-Interview Communication", U.S. Appl. No. 14/959,901, filed Feb. 10, 2017, 4 pages.
"Pre-Interview Communication", U.S. Appl. No. 14/959,730, Feb. 15, 2017, 4 pages.
"Pre-Interview Communication", U.S. Appl. No. 15/362,359, filed May 17, 2018, 4 pages.
"Pre-Interview Communication", U.S. Appl. No. 15/703,511, filed Feb. 11, 2019, 5 pages.
"Pre-Interview Communication", U.S. Appl. No. 14/494,863, filed Jan. 27, 2017, 5 pages.
"Pre-Interview Communication", U.S. Appl. No. 15/917,238, filed May 1, 2019, 6 pages.
"Pre-Interview Communication", U.S. Appl. No. 15/166,198, filed Mar. 8, 2018, 8 pages.
"Pre-Interview First Office Action", U.S. Appl. No. 15/286,152, filed Feb. 8, 2018, 4 pages.
"Pre-Interview Office Action", U.S. Appl. No. 14/862,409, filed Sep. 15, 2017, 16 pages.
"Pre-Interview Office Action", U.S. Appl. No. 14/731,195, filed Dec. 20, 2017, 4 pages.
"Preliminary Report on Patentability", Application No. PCT/US2016/034366, Dec. 7, 2017, 10 pages.
"Preliminary Report on Patentability", Application No. PCT/US2016/030177, Oct. 31, 2017, 11 pages.
"Preliminary Report on Patentability", Application No. PCT/US2016/030115, Oct. 31, 2017, 15 pages.
"Preliminary Report on Patentability", Application No. PCT/US2016/030185, Nov. 9, 2017, 16 pages.
"Preliminary Report on Patentability", Application No. PCT/US2016/065295, Jul. 24, 2018, 18 pages.
"Preliminary Report on Patentability", Application No. PCT/US2016/042013, Jan. 30, 2018, 7 pages.
"Preliminary Report on Patentability", Application No. PCT/US2016/062082, Nov. 15, 2018, 8 pages.
"Preliminary Report on Patentability", Application No. PCT/US2016/055671, Apr. 10, 2018, 9 pages.
"Preliminary Report on Patentability", Application No. PCT/US2016/032307, Dec. 7, 2017, 9 pages.
"Pressure-Volume Loop Analysis in Cardiology", retrieved from https://en.wikipedia.org/w/index.php?title=Pressure-volume loop analysis in cardiology&oldid=636928657 on Sep. 23, 2017; Obtained per link provided in search report from PCT/US2016/01398 on Jul. 28, 2016, Dec. 6, 2014, 10 pages.
"Restriction Requirement", U.S. Appl. No. 15/976,518, filed Jul. 9, 2020, 5 Pages.
"Restriction Requirement", U.S. Appl. No. 15/362,359, filed Jan. 8, 2018, 5 pages.
"Restriction Requirement", U.S. Appl. No. 14/666,155, filed Jul. 22, 2016, 5 pages.
"Restriction Requirement", U.S. Appl. No. 15/462,957, filed Jan. 4, 2019, 6 pages.
"Restriction Requirement", U.S. Appl. No. 16/563,124, filed Apr. 5, 2021, 7 pages.
"Restriction Requirement", U.S. Appl. No. 15/352,194, filed Feb. 6, 2019, 8 pages.
"Restriction Requirement", U.S. Appl. No. 15/286,537, filed Aug. 27, 2018, 8 pages.
"Samsung Galaxy S4 Air Gestures", Video retrieved from https://www.youtube.com/watch?v=375Hb87yGcg, May 7, 2013, 4 pages.
"Summons to Attend Oral Proceedings", EP Application No. 16724775.8, Mar. 17, 2022, 10 pages.
"Textile Wire Brochure", Retrieved at: http://www.textile-wire.ch/en/home.html, Aug. 7, 2004, 17 pages.
"The Dash smart earbuds play back music, and monitor your workout", Retrieved from <http://newatlas.com/bragi-dash-tracking-earbuds/30808/>, Feb. 13, 2014, 3 pages.
"The Instant Blood Pressure app estimates blood pressure with your smartphone and our algorithm", Retrieved at: http://www.instantbloodpressure.com/—on Jun. 23, 2016, 6 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 2018, 4 pages.
"Written Opinion", Application No. PCT/US2016/030185, Nov. 3, 2016, 15 pages.
"Written Opinion", Application No. PCT/US2017/032733, Jul. 24, 2017, 5 pages.
"Written Opinion", Application No. PCT/US2017/032733, Jul. 26, 2017, 5 pages.
"Written Opinion", Application No. PCT/US2016/042013, Feb. 2, 2017, 6 pages.
"Written Opinion", Application No. PCT/US2016/060399, May 11, 2017, 6 pages.
"Written Opinion", Application No. PCT/US2016/026756, Nov. 10, 2016, 7 pages.
"Written Opinion", Application No. PCT/US2016/055671, Apr. 13, 2017, 8 pages.
"Written Opinion", Application No. PCT/US2016/065295, Apr. 13, 2018, 8 pages.
"Written Opinion", Application No. PCT/US2017/051663, Oct. 12, 2018, 8 pages.
"Written Opinion", Application No. PCT/US2016/013968, Jul. 28, 2016, 9 pages.
"Written Opinion", Application No. PCT/US2016/030177, Nov. 3, 2016, 9 pages.
Amihood, Patrick M., et al., "Closed-Loop Manufacturing System Using Radar", Technical Disclosure Commons; Retrieved from http://www.tdcommons.org/dpubs_series/464, Apr. 17, 2017, 8 pages.
Antonimuthu , "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.

(56) References Cited

OTHER PUBLICATIONS

Arbabian, Amin , et al., "A 94GHz mm-Wave to Baseband Pulsed-Radar for Imaging and Gesture Recognition", , Apr. 4, 2013, pp. 1055-1071.
Azevedo, Stephen , et al., "Micropower Impulse Radar", Science & Technology Review, 7 pages.
Balakrishnan, Guha , et al., "Detecting Pulse from Head Motions in Video", In Proceedings: CVPR '13 Proceedings of the Conference on Computer Vision and Pattern Recognition, 8 pages.
Bondade, Rajdeep , et al., "A linear-assisted DC-DC hybrid power converter for envelope tracking RF power amplifiers", , Sep. 14, 2014, 5 pages.
Cheng, Jingyuan , "Smart Textiles: From Niche to Mainstream", IEEE Pervasive Computing, pp. 81-84.
Couderc, Jean-Philippe , et al., "Detection of Atrial Fibrillation using Contactless Facial Video Monitoring", , Jan. 2015, 7 pages.
Dias, T , et al., "Capacitive Fibre-Meshed Transducer for Touch & Proximity Sensing Applications", , Oct. 1, 2005, 5 pages.
Duncan, David P, "Motion Compensation of Synthetic Aperture Radar", Microwave Earth Remote Sensing Laboratory, Brigham Young University, Apr. 15, 2003, 5 pages.
Espina, Javier , et al., "Wireless Body Sensor Network for Continuous Cuff-less Blood Pressure Monitoring", , Sep. 2006, 5 pages.
Fan, Tenglong , et al., "Wireless Hand Gesture Recognition Based on Continuous-Wave Doppler Radar Sensors", , Nov. 1, 2016, 9 pages.
Farringdon, Jonny , et al., "Wearable Sensor Badge & Sensor Jacket for Context Awareness", Third International Symposium on Wearable Computers, 7 pages.
Fogle, O Ryan, et al., "Micro-Range/Micro-Doppler Decomposition of Human Radar Signatures", , Oct. 2012, 15 pages.
Garmatyuk, Dmitriy S, et al., "Ultra-Wideband Continuous-Wave Random Noise Arc-SAR", IEEE Transaction on Geoscience and Remote Sensing, vol. 40, No. 12, Dec. 2002, 10 pages.
Geisheimer, Jonathan L, et al., "A Continuous-Wave (CW) Radar for Gait Analysis", , Dec. 2001, 5 pages.
Godana, Bruhtesfa E, "Human Movement Characterization in Indoor Environment using GNU Radio Based Radar", , Nov. 30, 2009, 100 pages.
Gürbüz, Sevgi Z., et al., "Detection and Identification of Human Targets in Radar Data", Proc. SPIE 6567, Signal Processing, Sensor Fusion, and Target Recognition XVI, 656701, May 7, 2007, 12 pages.
He, David Da, "A Continuous, Wearable, and Wireless Heart Monitor Using Head Ballistocardiogram (BCG) and Head Electrocardiogram (ECG) with a Nanowatt ECG Heartbeat Detection Circuit", , Feb. 2013, 137 pages.
Holleis, Paul , et al., "Evaluating Capacitive Touch Input on Clothes", Proceedings of the 10th International Conference on Human Computer Interaction, 10 pages.
Holleis, Paul , et al., "Evaluating Capacitive Touch Input on Clothes", , Jan. 1, 2008, 11 pages.
Ishijima, Masa , "Unobtrusive Approaches to Monitoring Vital Signs at Home", , Sep. 26, 2007, 3 pages.
Karagozler, Mustafa Emre, et al., "Embedding Radars in Robots to Accurately Measure Motion", Technical Disclosure Commons; Retrieved from http://www.tdcommons.org/dpubs_series/454, Mar. 30, 2017, 8 pages.
Klabunde, Richard E, "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Kubota, Yusuke , et al., "A Gesture Recognition Approach by using Microwave Doppler Sensors", , Apr. 15, 2010, 12 pages.
Lee, Cullen E, "Computing the Apparent Centroid of Radar Targets", , May 1996, 21 pages.
Lien, Jaime , et al., "Embedding Radars in Robots for Safety and Obstacle Detection", Technical Disclosure Commons; Retrieved from http://www.tdcommons.org/dpubs_series/455, 10 pages.

Lien, Jaime , et al., "Soli: Ubiquitous Gesture Sensing with Millimeter Wave Radar", , Jul. 11, 2016, 19 pages.
Martinez-Garcia, Hermino , et al., "Four-quadrant linear-assisted DC/DC voltage regulator", , Apr. 23, 2016, 10 pages.
Matthews, Robert J, "Venous Pulse", Retrieved at: http://www.rjmatthewsmd.com/Definitions/venous_pulse.htm—on Nov. 30, 2016, Apr. 13, 2013, 7 pages.
Nakajima, Kazuki , et al., "Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, 8 pages.
Narasimhan, Shar , "Combining Self- & Mutual-Capacitive Sensing for Distinct User Advantages", Retrieved from the Internet: URL:http://www.designnews.com/author.asp?section_id=1365&doc_id=271356&print=yes [retrieved on Oct. 1, 2015], 5 pages.
Otto, Chris , et al., "System Architecture of a Wireless Body Area Sensor Network for Ubiquitous Health Monitoring", Journal of Mobile Multimedia; vol. 1, No. 4, 20 pages.
Palese , et al., "The Effects of Earphones and Music on the Temperature Measured by Infrared Tympanic Thermometer: Preliminary Results", ORL-head and neck nursing: official journal of the Society of Otorhinolaryngology and Head-Neck Nurses 32.2, Jan. 1, 2013, pp. 8-12.
Patel, P C, et al., "Applications of Electrically Conductive Yarns in Technical Textiles", International Conference on Power System Technology (POWECON), Oct. 30, 2012, 6 pages.
Poh, Ming-Zher , et al., "A Medical Mirror for Non-contact Health Monitoring", In Proceedings: ACM SIGGRAPH Emerging Technologies, 1 page.
Poh, Ming-Zher , et al., "Non-contact, Automated Cardiac Pulse Measurements Using Video Imaging and Blind Source Separation.", In Proceedings: Optics Express, vol. 18, No. 10, 13 pages.
Pu, Qifan , et al., "Gesture Recognition Using Wireless Signals", , Oct. 2014, pp. 15-18.
Pu, Qifan , et al., "Whole-Home Gesture Recognition Using Wireless Signals", , Sep. 2013, 12 pages.
Pu, Qifan , et al., "Whole-Home Gesture Recognition Using Wireless Signals", , Oct. 2013, 12 pages.
Pu, Qifan , et al., "Whole-Home Gesture Recognition Using Wireless Signals", , Sep. 30, 2013, 12 pages.
Pu, Quifan , et al., "Whole-Home Gesture Recognition Using Wireless Signals", MobiCom '13 Proceedings of the 19th annual international conference on Mobile computing & networking, 12 pages.
Schneegass, Stefan , et al., "Towards a Garment OS: Supporting Application Development for Smart Garments", Wearable Computers, ACM, 6 pages.
Skolnik, Merrill I., "CW and Frequency-Modulated Radar", In: "Introduction To Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
Stoppa, Matteo , "Wearable Electronics and Smart Textiles: A Critical Review", In Proceedings of Sensors, vol. 14, Issue 7, pp. 11957-11992.
Wang, Wenjin , et al., "Exploiting Spatial Redundancy of Image Sensor for Motion Robust rPPG", In Proceedings: IEEE Transactions on Biomedical Engineering, vol. 62, Issue 2, 11 pages.
Wang, Yazhou , et al., "Micro-Doppler Signatures for Intelligent Human Gait Recognition Using a UWB Impulse Radar", 2011 IEEE International Symposium on Antennas and Propagation (APSURSI), pp. 2103-2106.
Wijesiriwardana, R , et al., "Capacitive Fibre-Meshed Transducer for Touch & Proximity Sensing Applications", IEEE Sensors Journal, IEEE Service Center, 5 pages.
Zhadobov, Maxim , et al., "Millimeter-Wave Interactions with the Human Body: State of Knowledge and Recent Advances", , Jan. 2011, 11 pages.
Zhadobov, Maxim , et al., "Millimeter-wave Interactions with the Human Body: State of Knowledge and Recent Advances", International Journal of Microwave and Wireless Technologies, 11 pages.

(56) References Cited

OTHER PUBLICATIONS

Zhang, Ruquan, et al., "Study of the Structural Design and Capacitance Characteristics of Fabric Sensor", Advanced Materials Research (vols. 194-196), 8 pages.
Zheng, Chuan, et al., "Doppler Bio-Signal Detection Based Time-Domain Hand Gesture Recognition", , Dec. 9, 2013, 3 Pages.
"Foreign Office Action", EP Application No. 21156948.8, Jan. 3, 2025, 3 pages.

\* cited by examiner

RF-BASED MICRO-MOTION TRACKING FOR GESTURE TRACKING AND RECOGNITION

RELATED APPLICATIONS

This application is a continuation of and claims priority to U.S. patent application Ser. No. 17/023,122, filed Sep. 16, 2020, which in turn is a continuation of and claims priority to U.S. patent application Ser. No. 16/252,477, filed Jan. 18, 2019, now U.S. Pat. No. 10,817,070, issued on Oct. 27, 2020, which in turn is a continuation of and claims priority to U.S. patent application Ser. No. 15/142,689, filed Apr. 29, 2016, now U.S. Pat. No. 10,241,581, issued on Mar. 26, 2019, which in turn claims priority to U.S. Provisional Patent Application Ser. No. 62/155,357, filed May 28, 2015, and U.S. Provisional Patent Application Ser. No. 62/167,823, filed Apr. 30, 2015, the disclosures of which are incorporated by reference herein in their entireties.

BACKGROUND

Small-screen computing devices continue to proliferate, such as smartphones, computing bracelets, rings, and watches. Like many computing devices, these small-screen devices often use virtual keyboards to interact with users. On these small screens, however, many people find interacting through virtual keyboards to be difficult, as they often result in slow and inaccurate inputs. This frustrates users and limits the applicability of small-screen computing devices.

To address this problem, optical finger- and hand-tracking techniques have been developed, which enable gesture tracking not made on the screen. These optical techniques, however, have been large, costly, or inaccurate thereby limiting their usefulness in addressing usability issues with small-screen computing devices. Other conventional techniques have also been attempted with little success, including radar-tracking systems. These radar tracking systems struggle to determine small gesture motions without having large, complex, or expensive radar systems due to the resolution of the radar tracking system being constrained by the hardware of the radar system.

SUMMARY

This document describes techniques for radio frequency (RF) based micro-motion tracking. These techniques enable even millimeter-scale hand motions to be tracked. To do so, radar signals are used from radar systems that, with conventional techniques, would only permit resolutions of a centimeter or more.

This summary is provided to introduce simplified concepts concerning RF-based micro-motion tracking, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for RF-based micro-motion tracking are described with reference to the following drawings. The same numbers are used throughout the drawings to reference like features and components.

DETAILED DESCRIPTION

Overview

Techniques are described herein that enable RF-based micro-motion tracking. The techniques track millimeter-scale hand motions from radar signals, even from radar systems with a hardware-constrained conventional resolution that is coarser than the tracked millimeter-scale resolution.

A gesturing hand is a complex, non-rigid target with multiple dynamic components. Because of this, the range and velocity of hand sub-components, such as finger tips, a palm, or a thumb, are typically sub-resolution limits of conventional hardware. Thus, conventional hardware must be large, expensive, or complex to track small motions. Even for those conventional hardware that can track small motions, for real-time gesture-recognition applications, tracking algorithms are computationally constrained.

Figure 1:
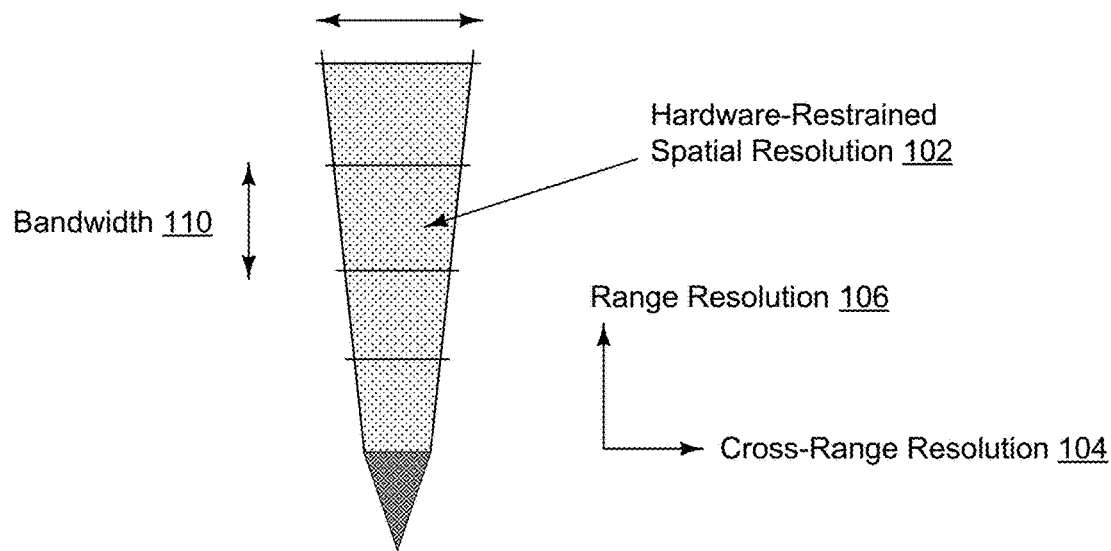
FIG. 1 illustrates a conventional system's hardware-constrained resolution.
Figure 1:
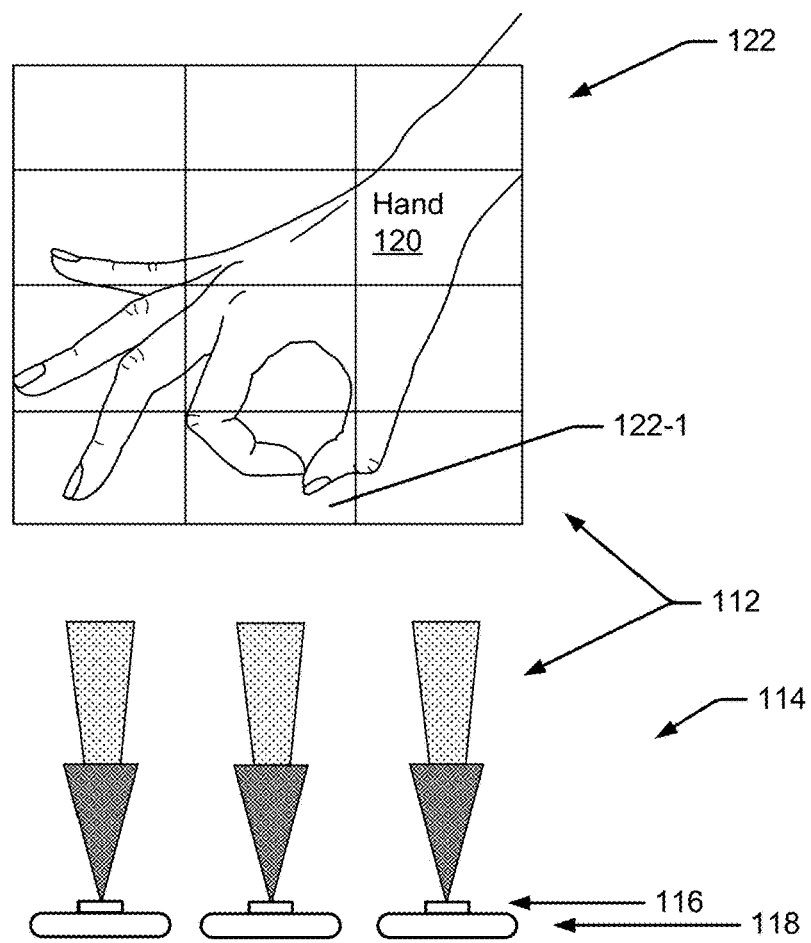

Consider a conventional system's hardware-constrained resolution, illustrated in FIG. 1. Here a hardware-constrained spatial resolution 102 consists of a cross-range resolution 104 and a range resolution 106. The cross-range resolution 104 is dependent on an antenna-beam width 108 and the range resolution 106 is dependent on a bandwidth 110, both of which are based on the hardware of the conventional radar system. The bandwidth 110 can be expressed as a pulse width or a wavelength.

To gain a better resolution, multiple antennas are often used in conventional radar systems, increasing complexity and cost. This is shown with a radar field 112 provided by a conventional radar system 114 with three separate radar-emitting elements 116 and antennas 118. Reflections are received from a hand 120 acting within the radar field 112 for each of the separate radar-emitting elements 116. Thus, each of twelve elements 122 are constrained at their size by the radar system's hardware. Note that a micro-motion of the hand 120, such as moving an index-finger against a thumb, would be within a particular element 122-1 of the elements 122. In such a case, the conventional system and techniques cannot determine that the micro-motion was made.

Figure 2:
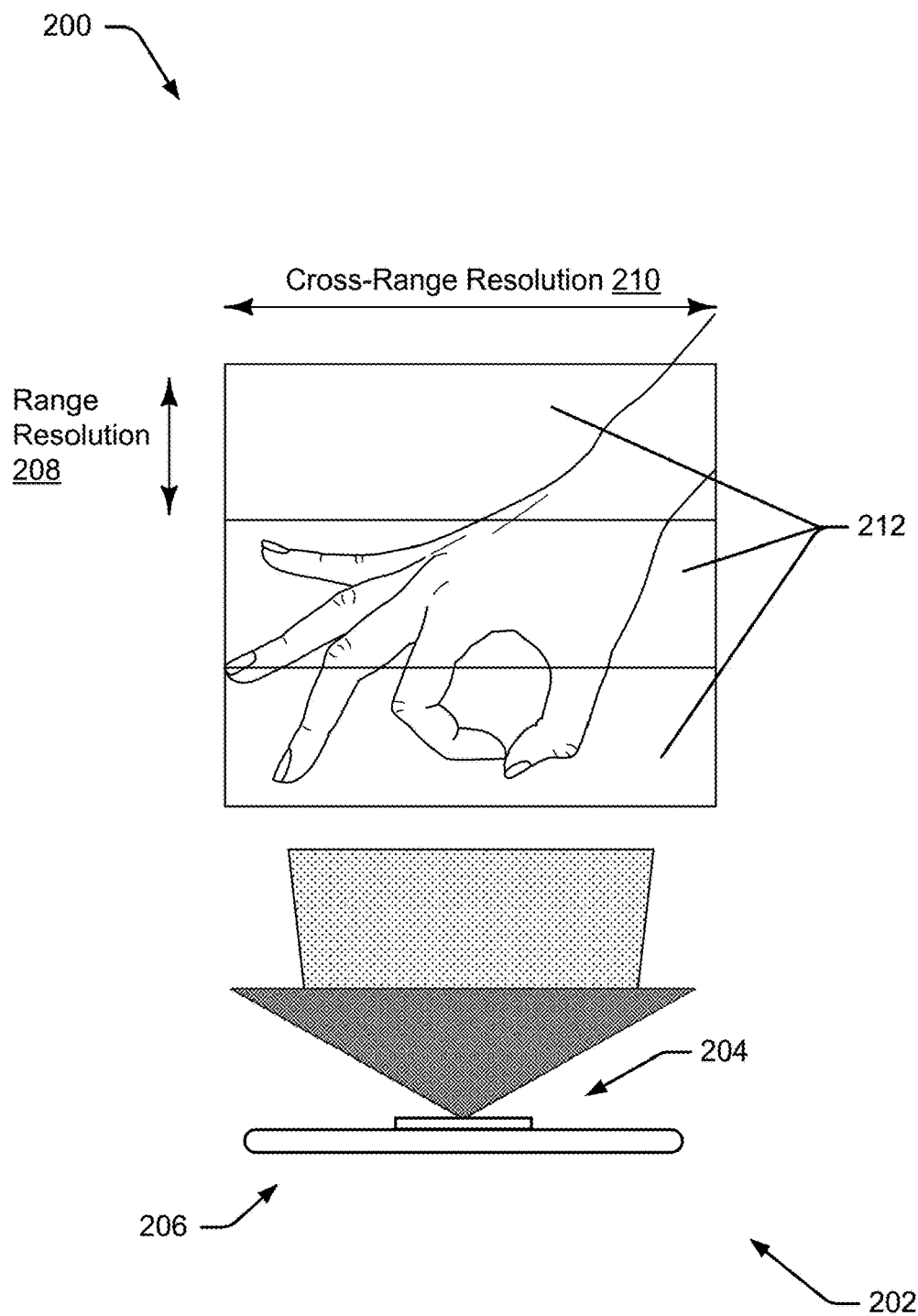
FIG. 2 illustrates an example environment in which techniques enabling RF-based micro-motion tracking may be embodied. The environment illustrates a fairly simple radar system through which techniques for micro-motion tracking can overcome hardware limitations of conventional radar systems, such as those illustrated in FIG. 1.

Contrast FIG. 1 with FIG. 2, which illustrates one environment 200 in which techniques for RF-based micro-motion tracking can overcome hardware limitations of conventional radar systems. In this illustration, a relatively simple radar system 202 is shown, having a single radar-emitting element 204 and a single antenna element 206. Contrast the single radar-emitting element 204 with the multiple radar-emitting elements 116 of FIG. 1, and the single antenna element 206 with the multiple antennas 118 of FIG. 1. Here the simple radar system 202 is simpler, and likely less expensive, smaller, or less complex than the conventional radar system 114. Further, the conventional radar system 114 cannot determine micro-motions of the hand 120 that require a higher resolution than permitted by the size of the elements 122, even with the conventional radar system 114's greater cost, size, or complexity.

As noted, radar systems have hardware-parameter-based displacement-sensing resolution limits for conventional techniques. These limits are based on parameters of the hardware of the system, such that a resolution of the simple radar system 202 has a range resolution 208 and cross-range resolution 210, for a hardware-constrained spatial resolution 212 (shown with three examples). As described below, however, the RF-based micro-motion tracking techniques enable micro-motion tracking of motions that are smaller, and thus a resolution that is finer, than the hardware-constrained limitations would conventionally suggest. Thus, the techniques permit a resolution of the relative displacement that is finer than the wavelength or beam width of the radar system.

This document now turns to an example computing device in which RF-based micro-motion tracking can be used, and then follows with an example method and gestures, and ends with an example computing system.

Example Computing Device

Figure 3:
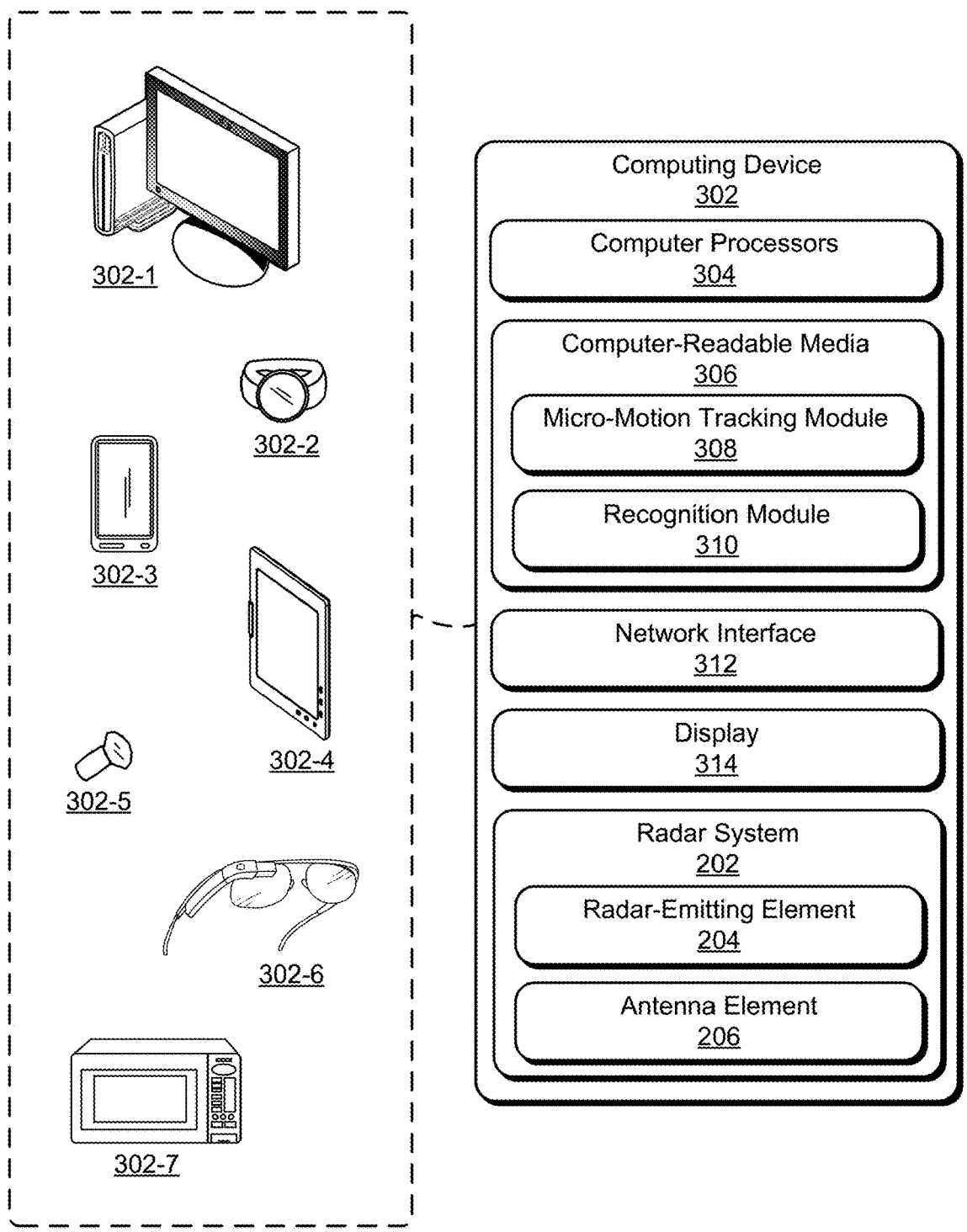
FIG. 3 illustrates a computing device through which determination of RF-based micro-motion tracking can be enabled.

FIG. 3 illustrates a computing device through which RF-based micro-motion tracking can be enabled. Computing device 302 is illustrated with various non-limiting example devices, desktop computer 302-1, computing watch 302-2, smartphone 302-3, tablet 302-4, computing ring 302-5, computing spectacles 302-6, and microwave 302-7, though other devices may also be used, such as home automation and control systems, entertainment systems, audio systems, other home appliances, security systems, netbooks, automobiles, and e-readers. Note that the computing device 302 can be wearable, non-wearable but mobile, or relatively immobile (e.g., desktops and appliances).

The computing device 302 includes one or more computer processors 304 and computer-readable media 306, which includes memory media and storage media. Applications and/or an operating system (not shown) embodied as computer-readable instructions on computer-readable media 306 can be executed by processors 304 to provide some of the functionalities described herein. The computer-readable media 306 also includes a micro-motion tracking module 308 and a recognition module 310, described below.

The computing device 302 may also include one or more network interfaces 312 for communicating data over wired, wireless, or optical networks and a display 314. The network interface 312 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. The display 314 can be integral with the computing device 302 or associated with it, such as with the desktop computer 302-1.

The computing device 302 may also include or be associated with a radar system, such as the radar system 202 of FIG. 2, including the radar-emitting element 204 and the antenna element 206. As noted above, this radar system 202 can be simpler, less costly, or less complex than conventional radar systems that still cannot, with conventional techniques, determine micro motions in the millimeter scale.

Figure 4:
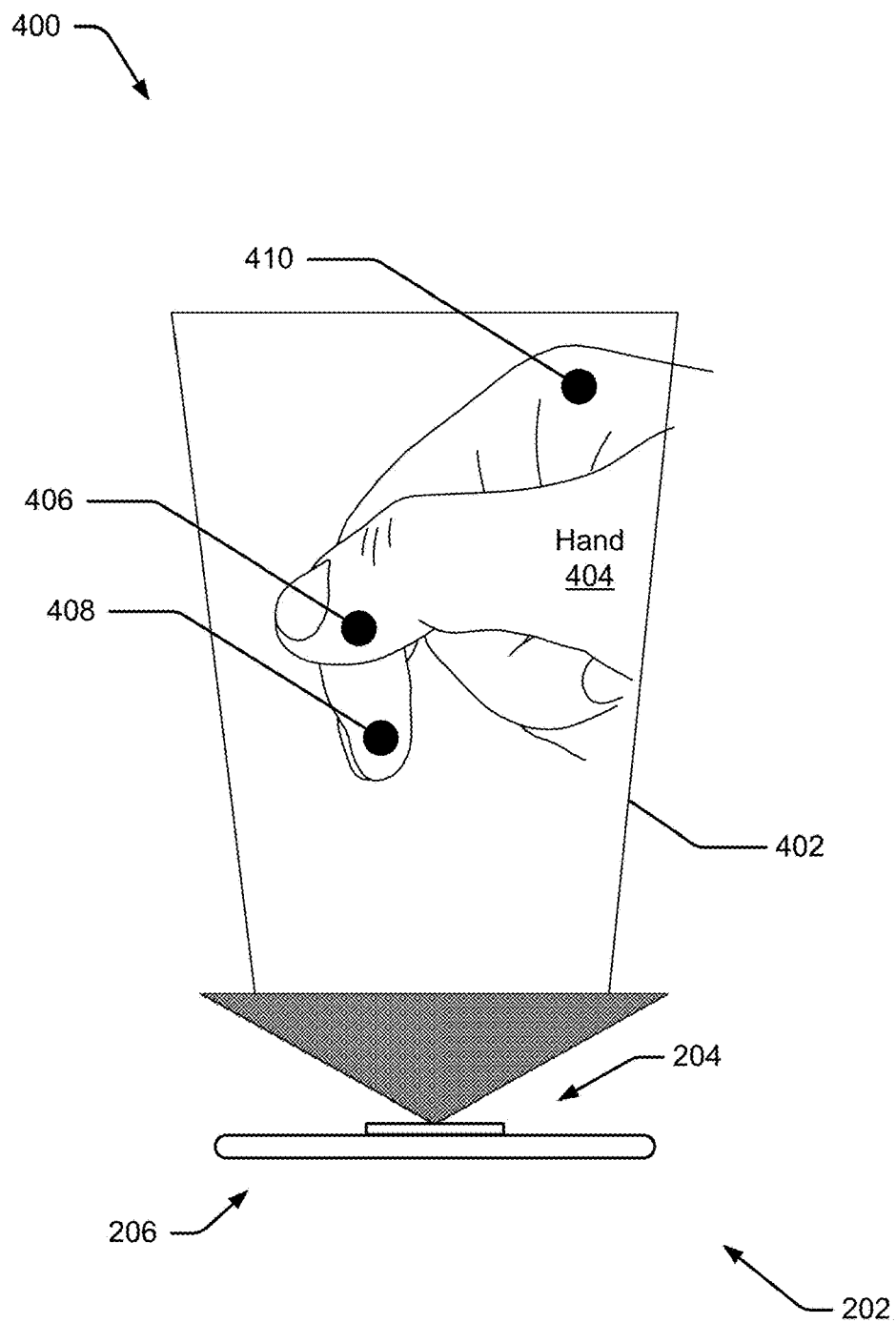
FIG. 4 illustrates the fairly simple radar system of FIG. 2 along with a hand acting within the provided radar field.

The micro-motion tracking module 308 is configured to extract relative dynamics from a radar signal representing a superposition of reflections of two or more points of a hand within a radar field. Consider in more detail the radar system 202 of FIG. 2 at environment 400 of FIG. 4, where the radar system 202 provides a radar field 402 in which a hand 404 may act. This hand 404 has various points of interest, some that move toward the radar antenna element 206, some that move away, and some that are immobile. This is illustrated at a thumb point 406, an index-finger point 408, and a knuckle point 410. Assume that for a micro-motion gesture, that the thumb point 406 is moving away from the antenna element 206, that the index-finger point 408 is moving toward the antenna element 206, and that the knuckle point 410 is immobile.

In more detail, for each of these points the micro-motion tracking module 308 may determine their relative velocity and energy. Thus, assume that the velocity of the thumb point 406 is 1.7 meters per second away, the index-finger point 408 is 2.1 meters per second toward, and the knuckle point 410 is zero meters per second. The micro-motion tracking module 308 determines a velocity profile for these points of the hand using the radar signal.

Figure 5:
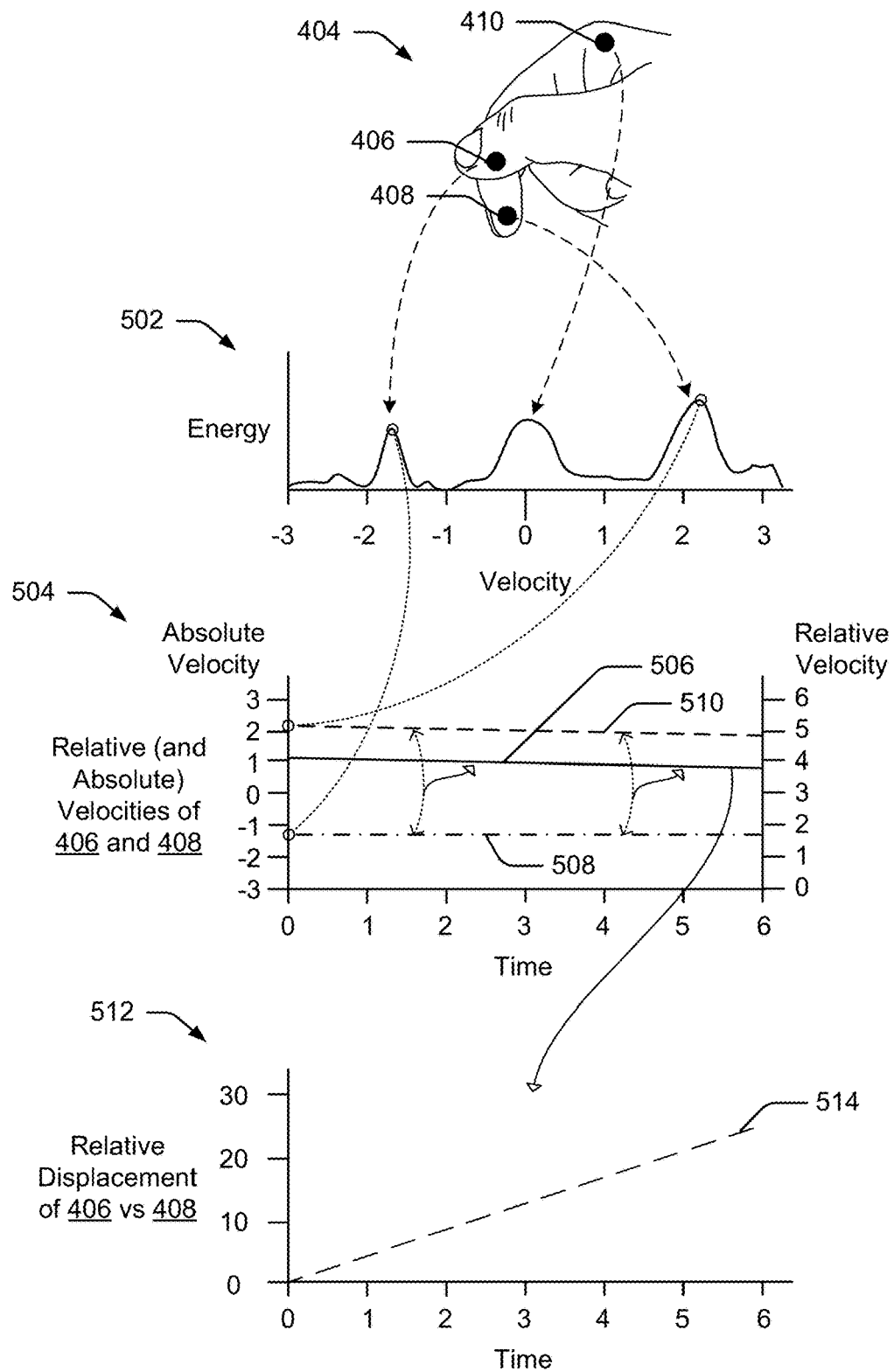
FIG. 5 illustrates a velocity profile, a relative velocity chart, and a relative displacement chart for points of a hand.

Consider, for example, FIG. 5, which illustrates a velocity profile 502, showing the velocity and energy for three points of hand 404. The velocity profile 502 shows, in arbitrary units, velocity vs energy, with higher energy measurements for the thumb point 406, the index-finger point 408, and the knuckle point 410. The velocity axis shows the knuckle point 410 not moving relative the antenna element 206, but a movement toward and away for the thumb point 406 and the index-finger point 408. The absolute velocity for each point is shown for clarity but is not required for the techniques, relative velocity is sufficient, and can use lighter-weight processing than determining absolute velocities and then comparing them to determine the relative velocity.

With this velocity profile 502, and other prior-determined or later-determined velocity profiles, the techniques can determine relative velocities between the points of the hand 404. Here the highest relative velocity is between the thumb point 406 and the index-finger point 408. The micro-motion tracking module 308 may determine a relative velocity (and then displacement) between the thumb point 406 and the knuckle point 410 or the index-finger point 408, though the relative displacement between the thumb point 406 and the index-finger point 408 is the largest relative displacement, which can improve gesture recognition and fineness of control. This resolution, however, may also or instead be better against other points, such as in cases where noise or other signal quality concerns are present for a point or points of the hand 404.

As noted, the velocity profile 502 indicates energies of each point of the hand 404. This energy is a measure of reflected energy intensity as a function of target range from each point to the emitter or antenna element, e.g., a radial distance from the radar-emitting element. A time delay between the transmitted signal and the reflection is observed through Doppler frequency, and thus the radial velocity is determined, and then integrated for radial distance. This observation of Doppler frequency can be through a range-Doppler-time data cube for the radar signal, though such a format is not required. Whatever the form for the data of the radar signal having the superposition of reflections of the points, integrating the relative velocities can quantitatively combine the Doppler-determined relative dynamics and an unwrapped signal phase of the radar signal. Optionally or in addition, an extended Kalman filter may be used to incorporate raw phase with the Doppler centroid for the point of the hand, which allows for nonlinear phase unwrapping.

In more detail, the following equations represent a manner in which to determine the velocity profile 502. Equation 1 represents incremental changes in phase as a function of incremental change in distance over a time period. More specifically, φ is phase, and thus Δφ(t,T) is change in phase. $r_i$ is distance, $\Delta r_i$ is displacement, and λ is wavelength, thus $\Delta r_i(t,T)/\lambda$ is change in displacement over wavelength. Each incremental change in phase equates to four t of the displacement change.

$$\Delta\varphi(t,T)=4\pi\Delta r_i(t,T)/\lambda \quad \text{Equation 1}$$

Equation 2 represents frequency, $f_{Doppler,i}(T)$, which is proportional to the time derivative of the phase, ½π dφ(t, T)/dT. Then, plugging in the time derivative of the displacement and wavelength, 2/λ dr(t,T)/dT, results in velocity, v, again over wavelength.

$$f_{Doppler,i}(T)=\tfrac{1}{2}\pi d\varphi(t,T)/dT=2/\lambda dr(t,T)/dT=2v(T)/\lambda \quad \text{Equation 2}$$

Equations 1 and 2 show the relationship between incremental velocity, such as points of a hand making micro-motions, to how this is shown in the signal reflected from those points of the hand.

Equation 3 shows how to estimate the frequency of the micro motions. The techniques calculate a Doppler spectrum using Doppler centroids, $f_{Doppler,centroid}(T)$, which shows how much energy is at each of the frequencies. The techniques pull out each of the frequencies that corresponds to each of the micro-motions using a centroid summation, $\Sigma_f F(f)$.

$$f_{Doppler,centroid}(T)=\Sigma_f f F(f) \quad \text{Equation 3}$$

Thus, the techniques build a profile of energies, such as the example velocity profile 502 of FIG. 2, which are moving at various velocities, such as the thumb point 406, the index-finger point 408, and the knuckle point 410. From this profile, the techniques estimate particular micro-motions as being at particular energies in the profile as described below.

Relative velocities chart 504 illustrates a relative velocity 506 over time. While shown for clarity of explanation, absolute thumb velocity 508 of the thumb point 406 and absolute index-finger velocity 510 of the index-finger 408 are not required. The relative velocity 506 can be determined without determining the absolute velocities. Showing these, however, illustrates the relative velocity between these velocities, and how it can change over time (note the slowdown of the thumb point 406 from 2.1 units to 1.9 units over the six time units).

With the relative velocities 506 determined over the six time units, a relative displacement can then be determined by integrating the relative velocities. This is shown with relative displacement chart 512, which illustrates a displacement trajectory 514. This displacement trajectory 514 is the displacement change of the thumb point 406 relative the index-finger point 408 over the six time units. Thus, the thumb point 406 and the index-finger point 408 move apart over the six time units by 24 arbitrary displacement units.

In some cases, the micro-motion tracking module 308 determines a weighted average of the relative velocities and then integrates the weighted averages to find their relative displacement. The weighted average can be weighted based on velocity readings having a higher probability of an accurate reading, lower noise, or other factors.

As shown in the example of FIG. 5, the techniques enable tracking of micro-motions, including using a low-bandwidth RF signal. This permits tracking with standard RF equipment, such as Wi-Fi routers, rather than having to change RF systems, or add complex or expensive radar systems.

Returning to FIG. 3, the recognition module 310 is configured to determine, based on a relative displacement of points on a hand, a gesture made by the hand. The recognition module 310 may then pass the gesture to an application or device.

Figure 6:
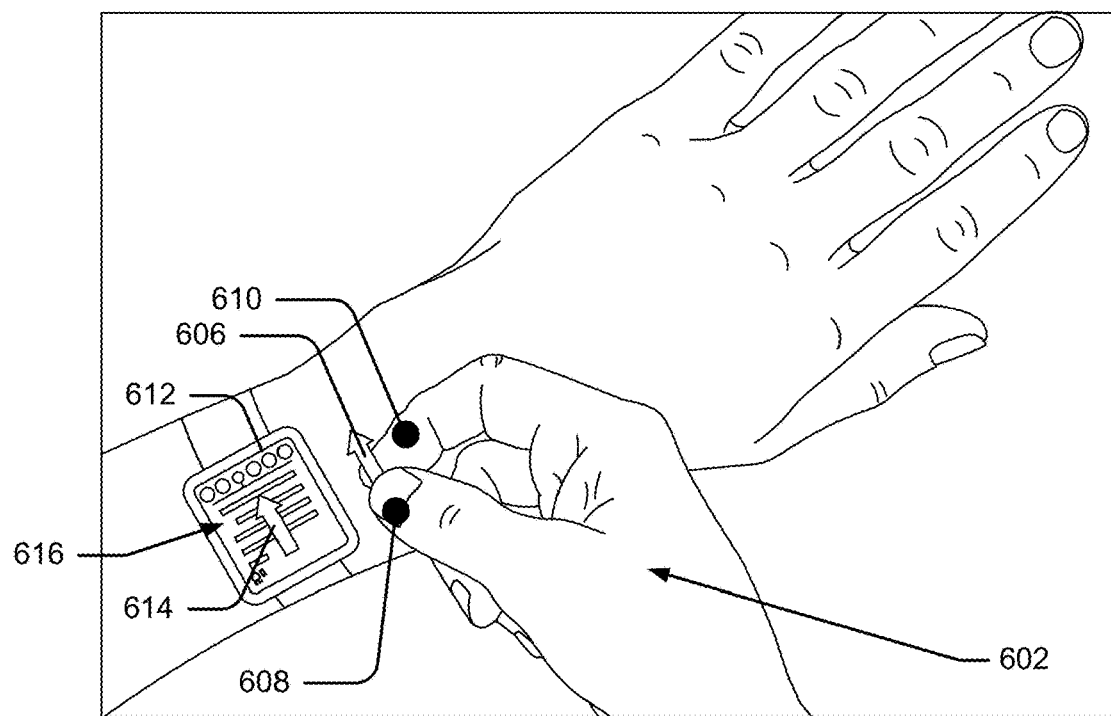
FIG. 6 illustrates an example gesture determined through RF-based micro-motion tracking, the example gesture having a micro-motion of a thumb against a finger, similar to rolling a serrated wheel of a traditional mechanical watch.
Figure 6:
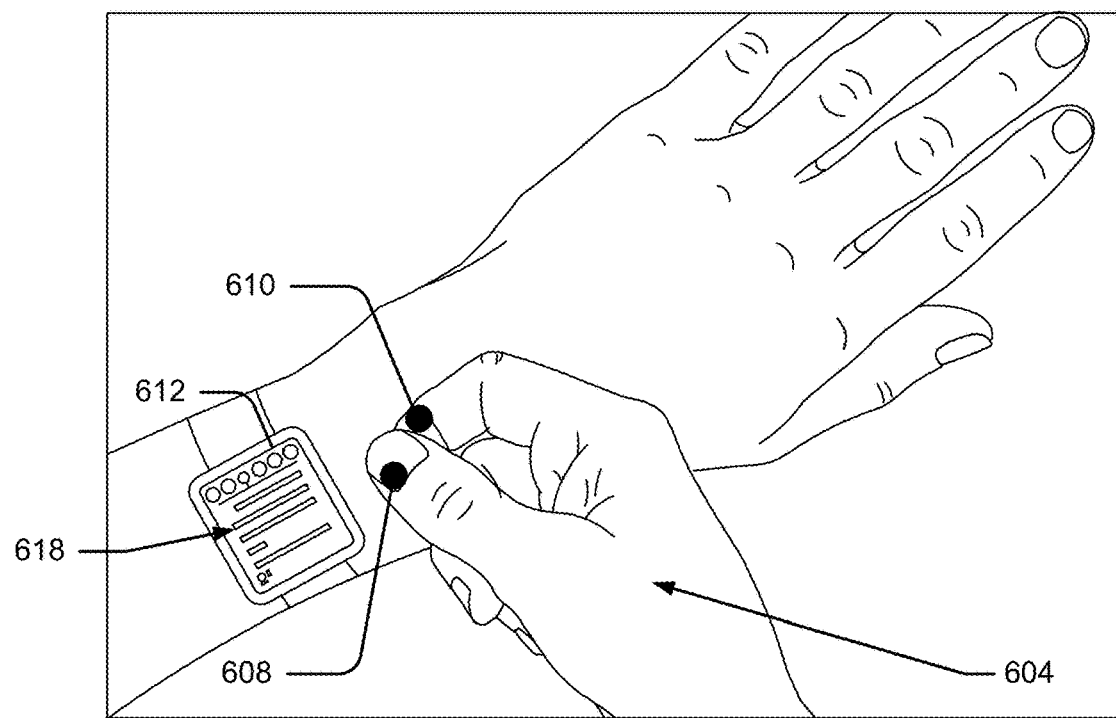

Assume, for example, that the gesture determined is a micro-motion of a thumb against a finger, similar to rolling a serrated wheel of a traditional mechanical watch. This example is illustrated in FIG. 6, which shows a start of the micro-gesture at start position 602, and an end of the micro-gesture at end position 604. Note that a movement 606 is made from the start to the end, but is not shown at intermediate positions for visual brevity. At the start position 602, a thumb point 608 and an index-finger point 610 positioned relative to each other with an end of the thumb at a tip of the finger. At the end position 604, the thumb, and thus the thumb point 608, has moved a few millimeters across the finger, and thus index-finger point 610, are each displaced relative the other by those few millimeters. The techniques are configured to track this gesture at finer resolutions than multiple millimeters, but this shows the start and end, and not intermediate measurements made.

With the displacement between the thumb point 608 and the index-finger point 610 made by the micro-motion tracking module 308, the recognition module 310 determines the gesture, and passes this gesture (generally as multiple sub-gestures as a complete gesture having sub-gesture portions is made) to an application—here to an application of the smart watch, which in turn alters user interface 612 to scroll up text being displayed (scrolling shown at scroll arrow 614 and results shown at starting text 616 and ending text 618). Tracked gestures can be large or small—millimeter scale is not required, nor is use of a single hand or even a human hand, as devices, such as robotic arms tracked to determine control for the robot, can be tracked. Thus, the micro-motion tracking module 308 may track micro-gestures having millimeter or finer resolution and a maximum of five centimeters in total relative displacement, or track a user's arm, hand or fingers relative to another hand, arm, or object, or larger gestures, such as multi-handed gestures with relative displacements of even a meter in size.

Example Method

Figure 7:
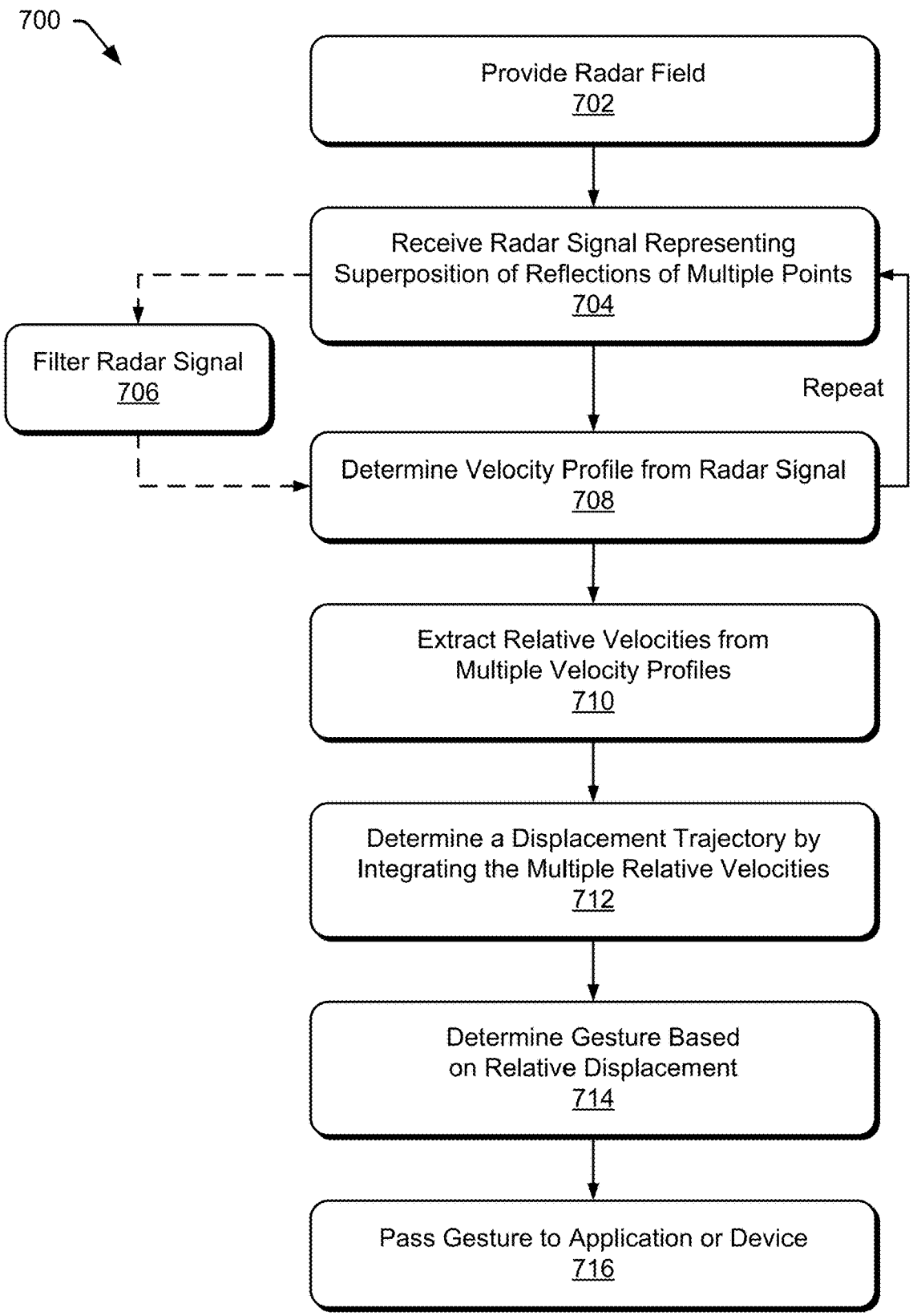
FIG. 7 illustrates an example method enabling gesture recognition through RF-based micro-motion tracking.

FIG. 7 depicts a method 700 that recognizes gestures using RF-based micro-motion tracking. The method 700 receives a radar signal from a radar system in which a hand makes a gesture, determines a displacement at a finer resolution than conventional techniques permit based on the parameters of the radar system, and then, based on this displacement, determine gestures, even micro-motion gestures in a millimeter scale. This method is shown as sets of blocks that specify operations performed but are not necessarily limited to the order or combinations shown for performing the operations by the respective blocks. In portions of the following discussion reference may be made to FIGS.

2-6, 8, and 9, reference to which is made for example only. The techniques are not limited to performance by one entity or multiple entities operating on one device, or those described in these figures.

At 702, a radar field is provided, such as shown in FIG. 2. The radar field can be provided by a simple radar system, including existing WiFi radar, and need not use complex, multi-emitter or multi-antenna, or narrow-beam scanning radars. Instead, a broad beam, full contiguous radar field can be used, such as 57-64 or 59-61 GHz, though other frequency bands, even sounds waves, can be used.

At 704, a radar signal representing a superposition of reflections of multiple points of a hand within the radar field is received. As noted, this can be received from as few as a single antenna. Each of the points of the hand has a movement relative to the emitter or antenna, and thus a movement relative to each other point. As few as two points can be represented and analyzed as noted below.

At 706, the radar signal can be filtered, such as with a Moving Target Indicator (MTI) filter. Filtering the radar signal is not required, but can remove noise or help to locate elements of the signal, such as those representing points having greater movement than others.

At 708, a velocity profile is determined from the radar signal. Examples of this determination are provided above, such as in FIG. 5.

At 710, relative velocities are extracted from the velocity profile. To determine multiple relative velocities over time, one or more prior-determined or later-determined velocity profiles are also determined. Thus, operations 704 and 708 can be repeated by the techniques, shown with a repeat arrow in FIG. 7.

At 712, a displacement trajectory is determined by integrating the multiple relative velocities. Relative velocities extracted from multiple velocity profiles over multiple times are integrated. An example of this is shown in FIG. 5, at the relative displacement chart 512.

At 714, a gesture is determined based on the displacement trajectory between the multiple points of the hand. As noted above, this gesture can be fine and small, such as a micro-gesture performed by one hand, or multiple hands or objects, or of a larger size.

At 716, the gesture is passed to an application or device. The gesture, on receipt by the application or device, is effective to control the application or device, such as to control or alter a display, function, or capability of the application or device. The device can be remote, peripheral, or the system on which the method 700 is performed.

This determined displacement trajectory shows a displacement in the example of FIG. 6 between a point at a knuckle and another point at a fingertip, both of which are moving. It is not required that the RF-based micro-motion tracking techniques track all points of the hand, or even many points, or even track two points in three-dimensional space. Instead, determining displacement relative from one point to another can be sufficient to determine gestures, even those of one millimeter or finer.

Through operations of method 700, relative dynamics are extracted from the radar signal representing the superposition of the reflections of the multiple points of the hand within the radar field. These relative dynamics indicate a displacement of points of the hand relative one to another, from which micro-motion gestures can be determined. As noted above, in some cases extracting relative dynamics from the superposition determines micro-Doppler centroids for the points. These micro-Doppler centroids enable computationally light super-resolution velocity estimates to be determined. Thus, the computational resources needed are relatively low compared to conventional radar techniques, further enabling use of these RF-based micro-motion techniques in small or resource-limited devices, such as some wearable devices and appliances. Not only can these techniques be used on resource-limited devices, but the computationally light determination can permit faster response to the gesture, such as in real time as a small, fine gesture (e.g., a micro-gesture) is made to make small, fine control of a device.

Further, the RF-based micro-motion techniques, by using micro-Doppler centroids, permits greater robustness to noise and clutter than use of Doppler profile peaks. To increase resolution, the micro-motion tracking module 308 may use the phase change of the radar signal to extract millimeter and sub-millimeter displacements for high-frequency movements of the points.

Example Gestures

The RF-based micro-motion techniques described in FIGS. 2-7 enable gestures even in the millimeter or sub-millimeter scale. Consider, for example, FIGS. 8 and 9, which illustrate two such gestures.

Figure 8:
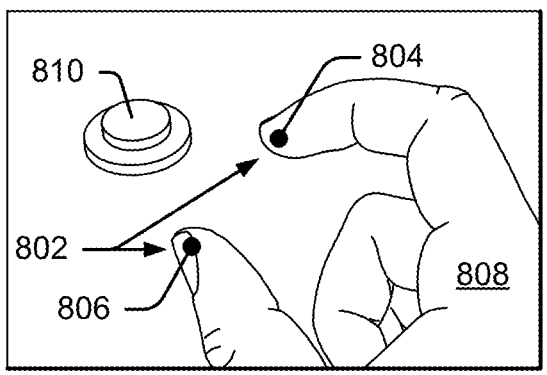
FIG. 8 illustrates an example gesture in three sub-gesture steps, the gesture effective to press a virtual button.
Figure 8:
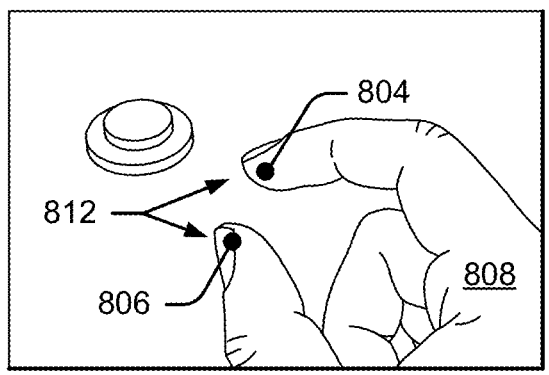
Figure 8:
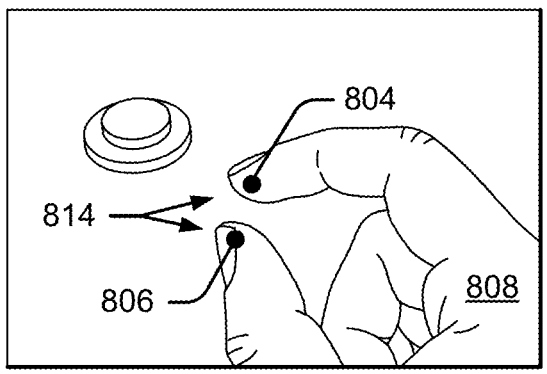
Figure 8:
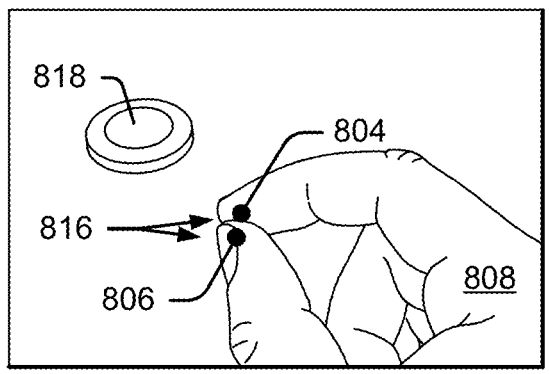

FIG. 8 illustrates a gesture having a resolution of 10 or fewer millimeters, in three sub-gesture steps. Each of the steps can be tracked by the micro-motion module 308, and sub-gestures determined by the recognition module 310. Each of these sub-gestures can enable control, or completion of the last of the sub-gestures may be required prior to control being made. This can be driven by the application receiving the gesture or the recognition module 310, as the recognition module 310 may have parameters from the application or device intended to receive the gesture, such as data indicating that only completion of contact of a thumb and finger should be passed to the application or device.

This is the case for FIG. 8, which shows a starting position 802 of two points 804 and 806 of a hand 808, with a user interface showing an un-pressed virtual button 810. A first sub-gesture 812 is shown where the two points 804 and 806 (fingertip and thumb tip) move closer to each other. A second sub-gesture 814 is also shown where the two points 804 and 806 move even closer. The third sub-gesture 816 completes the gesture where the two points 804 and 806 touch or come close to touching (depending on if the points 804 and 806 are at exactly the tips of the finger and thumb or are offset). Here assume that the micro-motion tracking module 308 determines displacements between the points 804 and 806 at each of the three sub-gestures 812, 814, and 816, and passes these to the recognition module 310. The recognition module 310 waits to pass the complete gesture when the points touch or nearly so, at which point the application receives the gesture and indicates in the user interface that the button has been pressed, shown at pressed virtual button 818.

Figure 9:
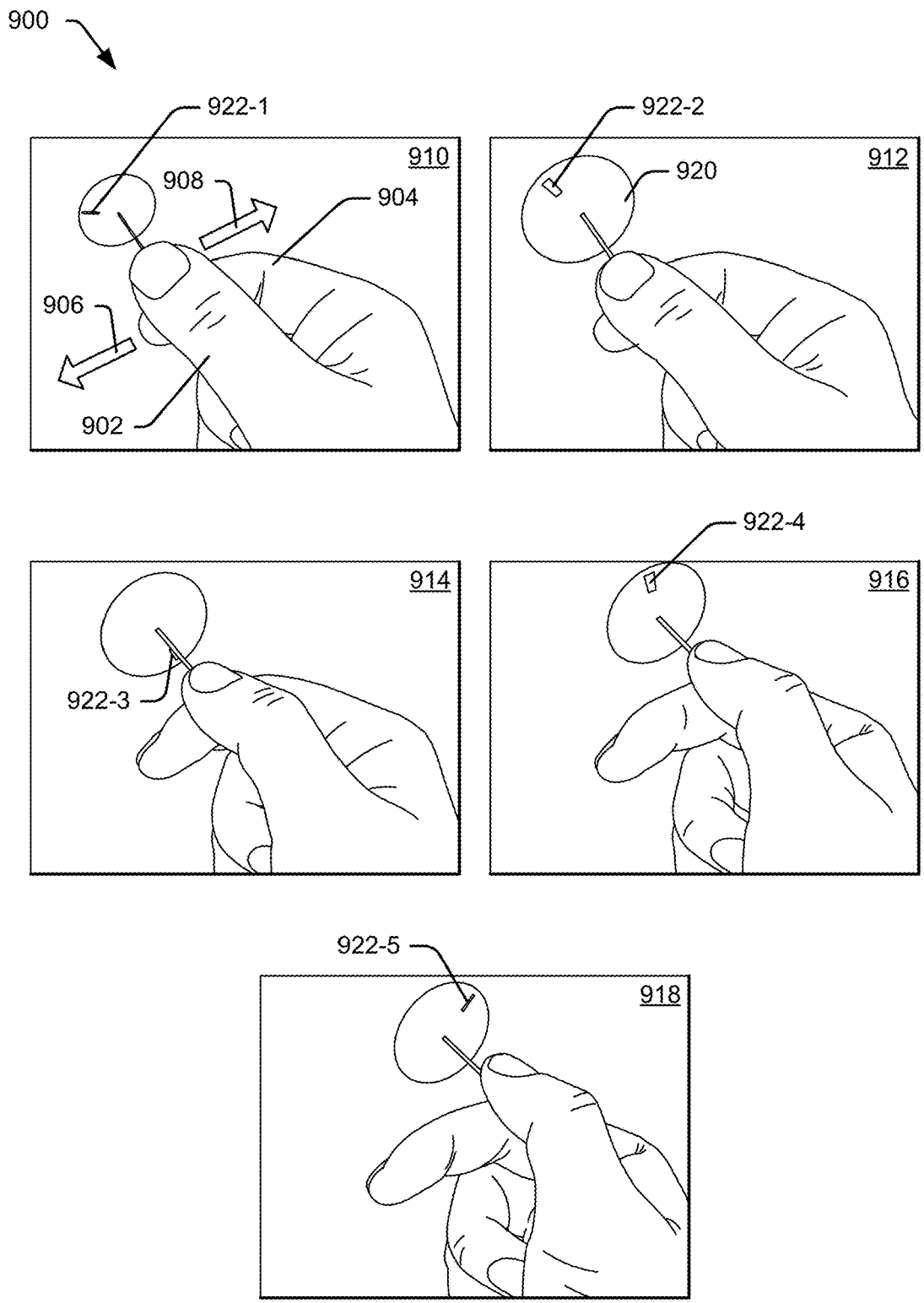
FIG. 9 illustrates an example rolling micro-motion gesture in four steps, the rolling micro-motion gesture permitting fine motion and control through RF-based micro-motion tracking.

By way of further example, consider FIG. 9, which illustrates a rolling micro-motion gesture 900. The rolling micro-motion gesture 900 involves motion of a thumb 902 against an index-finger 904, with both the thumb 902 and the index-finger 904 moving in roughly opposite directions—thumb direction 906 and index-finger direction 908.

The rolling micro-motion gesture 900 is shown at a starting position 910 and with four sub-gestures positions 912, 914, 916, and 918, though these are shown for visual brevity, as many more movements, at even sub-millimeter resolution through the full gesture, can be recognized. To better visualize an effect of the rolling micro-motion gesture 900, consider a marked wheel 920. This marked wheel 920 is not held by the thumb 902 and the index-finger 904, but is shown to aid the reader in seeing ways in which the gesture, as it is performed, can be recognized and used to make fine-resolution control, similar to the way in which a mark 922 moves as the marked wheel 920 is rotated, from a start point at mark 922-1, to mark 922-2, to mark 922-3, to mark 922-4, and ending at mark 922-5.

As the rolling micro-motion gesture 900 is performed, the micro-motion tracking module 308 determines displacement trajectories between a point or points of each of the thumb 902 and the index-finger 904, passes these to the gesture module 310, which in turn determines a gesture or portion thereof being performed. This gesture is passed to a device or application, which is thereby controlled by the micro-motion gesture. For this type of micro-motion, an application may advance through media being played (or reverse if the gesture is performed backwards), scroll through text or content in a display, turn up volume for music, a temperature for a thermostat, or another parameter. Further, because the RF-based micro-motion techniques have a high resolution and light computational requirements, fine motions in real time can be recognized, allowing a user to move her thumb and finger back and forth to easily settle on an exact, desired control, such as a precise volume 34 on a scale of 100 or to precisely find a frame in a video being played.

Example Computing System

Figure 10:
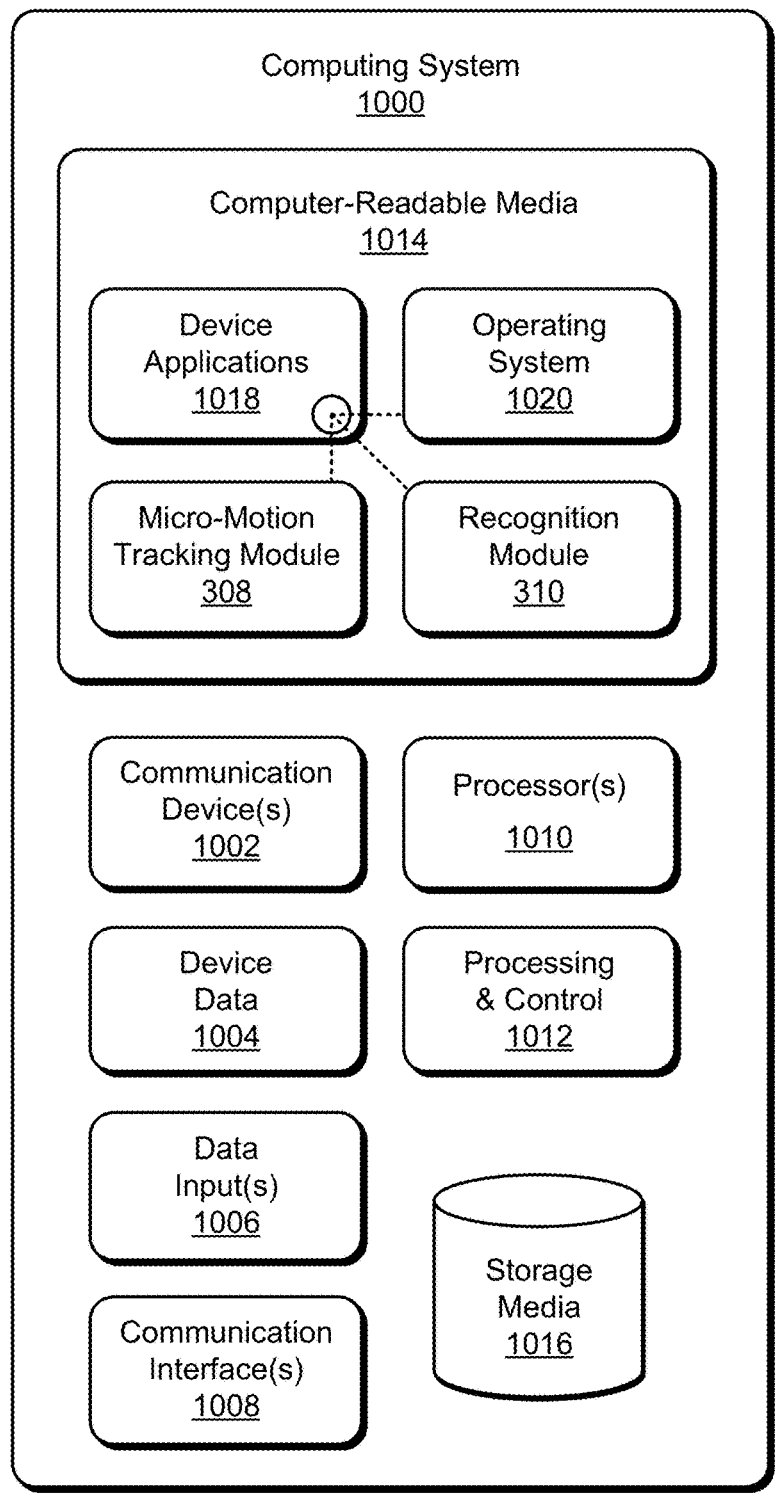
FIG. 10 illustrates an example computing system embodying, or in which techniques may be implemented that enable use of, RF-based micro-motion tracking.

FIG. 10 illustrates various components of an example computing system 1000 that can be implemented as any type of client, server, and/or computing device as described with reference to the previous FIGS. 2-8 to implement RF-based micro-motion tracking.

The computing system 1000 includes communication devices 1002 that enable wired and/or wireless communication of device data 1004 (e.g., received data, data that is being received, data scheduled for broadcast, data packets of the data, etc.). Device data 1004 or other device content can include configuration settings of the device, media content stored on the device, and/or information associated with a user of the device (e.g., an identity of an actor performing a gesture). Media content stored on the computing system 1000 can include any type of audio, video, and/or image data. The computing system 1000 includes one or more data inputs 1006 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

The computing system 1000 also includes communication interfaces 1008, which can be implemented as any one or more of a serial and/or parallel interface, a wireless interface, any type of network interface, a modem, and as any other type of communication interface. Communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000 and to enable techniques for, or in which can be embodied, RF-based micro-motion tracking. Alternatively or in addition, the computing system 1000 can be implemented with any one or combination of hardware, firmware, or fixed logic circuitry that is implemented in connection with processing and control circuits, which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control module, code that is native to a particular device, an abstraction module or gesture module and so on. The device applications 1018 also include system components, engines, or managers to implement RF-based micro-motion tracking, such as the micro-motion tracking module 308 and the recognition module 310.

The computing system 1000 may also include, or have access to, one or more of radar systems, such as the radar system 202 having the radar-emitting element 204 and the antenna element 206. While not shown, one or more elements of the micro-motion tracking module 308 or the recognition module 310 may be operated, in whole or in part, through hardware or firmware.

CONCLUSION

Although techniques using, and apparatuses including, RF-based micro-motion tracking have been described in language specific to features and/or methods, it is to be understood that the subject of the appended claims is not necessarily limited to the specific features or methods described. Rather, the specific features and methods are disclosed as example implementations of ways in which to determine RF-based micro-motion tracking.

What is claimed is:

1. A computer-implemented method for gesture recognition, the computer-implemented method comprising:
   receiving first reflections of a radar field off first and second points of a single non-rigid target at a first time, the first and second points of the single non-rigid target moving at first and second Doppler-based velocities, respectively;
   generating, based on the received first reflections, Doppler-based measurements representing a velocity profile of the single non-rigid target, the Doppler-based measurements including first and second measurements respectively associated with the first and second Doppler-based velocities, the first and second measurements having higher energies than another measurement corresponding to another point of the single non-rigid target that is moving at another Doppler-based velocity, and the first and second points moving relative to one another within the radar field;

determining, based on the first and second measurements, a first relative velocity between the first and second points at the first time;

receiving second reflections of the radar field off the first and second points at a second time;

determining, based on the second reflections, a second relative velocity between the first and second points at the second time; and determining, based on the first and second relative velocities, a gesture performed by the single non-rigid target.

2. The computer-implemented method of claim 1, further comprising determining, based on the first and second relative velocities, a change in displacement between the first and second points between the first and second times.

3. The computer-implemented method of claim 2, wherein determining the gesture is based further on the change in displacement.

4. The computer-implemented method of claim 1, wherein the energies correspond to respective ranges to the first and second points and the other point of the single non-rigid target.

5. The computer-implemented method of claim 1, further comprising identifying, based on a moving target indicator filter, the first and second points from the other point of the single non-rigid target within the first and second reflections.

6. The computer-implemented method of claim 1, further comprising passing the gesture to an application or device effective to control or alter a display, function, or capability associated with the application or the device.

7. The computer-implemented method of claim 1, wherein the Doppler-based measurements for the first and second points at the first and second times are determined to have one or more of high accuracy or low noise compared to other determined Doppler frequencies.

8. The computer-implemented method of claim 1, further comprising creating a range-Doppler-time data cube for the single non-rigid target, wherein the determining the gesture is based further on the range-Doppler-time data cube.

9. The computer-implemented method of claim 1, wherein a resolution of the gesture recognition is finer than a wavelength of the radar field.

10. The computer-implemented method of claim 1, wherein the single non-rigid target is a hand.

11. The computer-implemented method of claim 1, wherein determining the first relative velocity and the second relative velocity does not include determining an absolute velocity of the first and second points.

12. The computer-implemented method of claim 1, wherein the radar field is a broad beam, fully contiguous radar field.

13. An apparatus comprising:
at least one computer processor;
a radar system comprising:
at least one radar-emitting element configured to provide a radar field; and
one or more antenna elements configured to receive radar signals representing reflections of the radar field off points of a single non-rigid object within the radar field; and one or more computer-readable storage media having instructions stored thereon that, responsive to execution by the processor, cause the at least one computer processor to:

receive first reflections of a radar field off first and second points of a single non-rigid target at a first time, the first and second points of the single non-rigid target moving at first and second Doppler-based velocities, respectively;

generate, based on the received first reflections, Doppler-based measurements representing a velocity profile of the single non-rigid target, the Doppler-based measurements including first and second measurements respectively associated with the first and second Doppler-based velocities, the first and second measurements having higher energies than another measurement corresponding to another point of the single non-rigid target that is moving at another Doppler-based velocity, and the first and second points moving relative to one another within the radar field;

determine, based on the first and second measurements, a first relative velocity between the first and second points at the first time;

receive second reflections of the radar field off the first and second points at a second time;

determine, based on the second reflections, a second relative velocity between the first and second points at the second time; and determine, based on the first and second relative velocities, a gesture performed by the single non-rigid target.

14. The apparatus of claim 13, wherein:
the instructions further cause the at least one computer processor to determine, based on the first and second relative velocities, a change in displacement between the first and second points between the first and second times; and determining the gesture is based further on the change in the displacement.

15. The apparatus of claim 13, wherein the instructions further cause the at least one computer processor to identify, based on a moving target indicator filter, the first and second points from the other point of the single non-rigid target within the first and second reflections.

16. The apparatus of claim 13, wherein the instructions further cause the at least one computer processor to pass the gesture to an application executing on the apparatus or to a device effective to control or alter a display, function, or capability associated with the application or the device.

17. The apparatus of claim 13, wherein
the Doppler-based measurements for the first and second points at the first and second times are determined to have one or more of high accuracy or low noise compared to other determined Doppler frequencies.

18. The apparatus of claim 13, wherein a resolution of the gesture recognition is finer than a wavelength of the radar field.

19. The apparatus of claim 13, wherein the radar field is a broad beam, fully contiguous radar field.

20. The apparatus of claim 13, wherein the instructions further cause the at least one computer processor to determine the first relative velocity and the second relative velocity without determining an absolute velocity of the first and second points.

21. The apparatus of claim 13, wherein the energies correspond to respective ranges to the first and second points and the other point of the single non-rigid target.

22. The apparatus of claim 13, wherein the instructions further cause the at least one computer processor to create a range-Doppler-time data cube for the single non-rigid target, wherein the determination of the gesture is based further on the range-Doppler-time data cube.

23. The apparatus of claim 13, wherein the single non-rigid target is a hand.

* * * * *